United States Patent
Seyama

(10) Patent No.: US 8,891,693 B2
(45) Date of Patent: Nov. 18, 2014

(54) SIGNAL PROCESSING METHOD AND RECEIVER FOR WIRELESS COMMUNICATION SYSTEM

(75) Inventor: Takashi Seyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 506 days.

(21) Appl. No.: 13/208,930

(22) Filed: Aug. 12, 2011

(65) Prior Publication Data

US 2012/0128085 A1 May 24, 2012

(30) Foreign Application Priority Data

Nov. 19, 2010 (JP) ................................. 2010-259303

(51) Int. Cl.
*H04L 27/06* (2006.01)
*H04L 25/03* (2006.01)
*H04L 25/02* (2006.01)

(52) U.S. Cl.
CPC ...... *H04L 25/0204* (2013.01); *H04L 25/03337* (2013.01); *H04L 2025/03426* (2013.01)
USPC ............................. 375/341; 375/262; 375/346

(58) Field of Classification Search
CPC ............ H04L 25/0246; H04L 25/0321; H04L 25/03191; H04L 25/03197; H04L 25/03337
USPC .................. 375/262, 341, 346, 347, 260, 267
See application file for complete search history.

(56) References Cited

U.S. PATENT DOCUMENTS

| | | | |
|---|---|---|---|
| 7,672,408 B2 * | 3/2010 | Higuchi et al. ............... | 375/347 |
| 7,961,826 B2 * | 6/2011 | Waters et al. ................. | 375/347 |
| 8,369,441 B2 * | 2/2013 | Ito ................................. | 375/267 |
| 8,447,797 B2 * | 5/2013 | Park et al. ..................... | 708/212 |
| 2008/0095257 A1 | 4/2008 | Maeda et al. | |
| 2009/0213965 A1 * | 8/2009 | Maeda et al. ................. | 375/341 |
| 2010/0124299 A1 | 5/2010 | Ogawa et al. | |
| 2011/0216693 A1 * | 9/2011 | Amiri et al. ................... | 370/328 |

FOREIGN PATENT DOCUMENTS

| | | |
|---|---|---|
| JP | 2006-121348 | 5/2006 |
| JP | 2006-222872 | 8/2006 |
| JP | 2008-182332 | 8/2008 |
| WO | 2009/016741 A1 | 2/2009 |

OTHER PUBLICATIONS

Higuchi, Kenichi et al., "Adaptive Selection of Surviving Symbol Replica Candidates Based on Maximum Reliability in QRM-MLD for OFCDM MIMO Multiplexing", Proc. of IEEE Communications Society Globecom 2004, pp. 2480-2486.

(Continued)

*Primary Examiner* — Sophia Vlahos
(74) *Attorney, Agent, or Firm* — Fujitsu Patent Center

(57) ABSTRACT

A receiver selects, regarding each of signals corresponding to component elements of a transmission column vector, a number of transmission signal candidates equal to a number according to a predetermined parameter based on inter-signal point distances between a plurality of transmission signal candidates regarding the transmission column vector and the signal from among the plural transmission signal candidates. Then, the receiver reproduces the transmission signal by determining a unique set of transmission signal candidates regarding each component element of the transmission column vector based on the sum total of the inter-signal point distances between the selected transmission signal candidates and the signals.

5 Claims, 20 Drawing Sheets

(56) References Cited

OTHER PUBLICATIONS

Kim, Kyeong J. et al., "Joint Channel Estimation and Data Detection Algorithms for MIMO-OFDM Systems", Proc. Thirty-Sixth Asilomar Conference on Signals, Systems and Computers, Nov. 2002, pp. 1857-1861.

JPOA—Office Action of Japanese Patent Application No. 2010-259303, dated Jun. 24, 2014 with full English Translation of the Office Action.

* cited by examiner

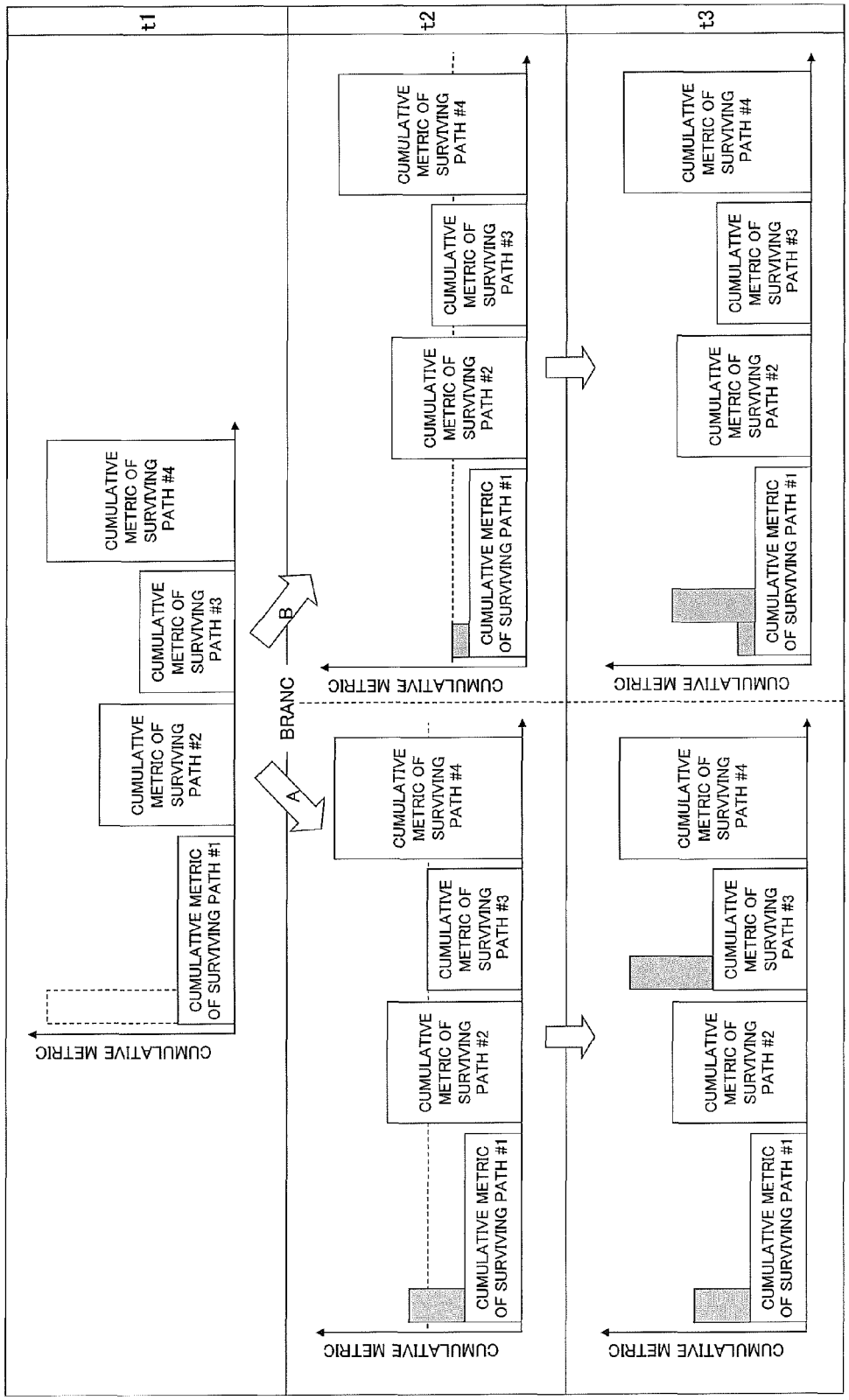
FIG. 3 —Related Art—

FIG. 7

| REGION NUMBER | RANKING | | | |
|---|---|---|---|---|
| | 1 | 2 | 3 | 4 |
| 0 | 0 | 1 | 2 | 3 |
| 1 | 1 | 0 | 3 | 2 |
| 2 | 2 | 0 | 3 | 1 |
| 3 | 3 | 1 | 2 | 0 |

FIG. 9

| REGION NUMBER | RANKING | | | |
|---|---|---|---|---|
| | 1 | 2 | 3 | 4 |
| 0 | 0 | 1 | 2 | 3 |
| 1 | 0 | 2 | 1 | 3 |
| 2 | 0 | 1 | 2 | 3 |
| 3 | 0 | 1 | 2 | 3 |
| 4 | 1 | 0 | 3 | 2 |
| 5 | 1 | 3 | 0 | 2 |
| 6 | 1 | 0 | 3 | 2 |
| 7 | 1 | 0 | 3 | 2 |
| 8 | 2 | 0 | 3 | 1 |
| 9 | 2 | 0 | 3 | 1 |
| 10 | 2 | 3 | 0 | 1 |
| 11 | 2 | 0 | 3 | 1 |
| 12 | 3 | 1 | 2 | 0 |
| 13 | 3 | 1 | 2 | 0 |
| 14 | 3 | 2 | 1 | 0 |
| 15 | 3 | 1 | 2 | 0 |

| i | $0≤α<1$ | $1≤α<2$ | $2≤α<3$ | $3≤α<4$ | $4≤α<5$ | $5≤α<6$ | $6≤α<7$ | $7≤α<8$ | $8≤α<9$ | $9≤α<10$ | $10≤α<15$ | $15≤α$ |
|---|---|---|---|---|---|---|---|---|---|---|---|---|
| | PASS NUMBER $σ(i)$ TO BE SELECTED | | | | | | | | | | | |
| 1 | 8 | 4 | 3 | 3 | 2 | 2 | 2 | 2 | 2 | 2 | 2 | 1 |
| 2 | 4 | 4 | 3 | 3 | 2 | 2 | 2 | 2 | 2 | 2 | 2 | 1 |
| 3 | 2 | 3 | 2 | 2 | 2 | 2 | 2 | 2 | 2 | 2 | 1 | 1 |
| 4 | 2 | 3 | 2 | 2 | 2 | 2 | 2 | 2 | 2 | 2 | 1 | 1 |
| 5 | 0 | 2 | 2 | 2 | 2 | 2 | 2 | 2 | 2 | 1 | 1 | 1 |
| 6 | 0 | 0 | 2 | 1 | 2 | 2 | 2 | 2 | 1 | 1 | 1 | 1 |
| 7 | 0 | 0 | 1 | 1 | 1 | 1 | 1 | 1 | 1 | 1 | 1 | 1 |
| 8 | 0 | 0 | 0 | 0 | 0 | 1 | 1 | 1 | 1 | 1 | 1 | 1 |
| 9 | 0 | 0 | 0 | 0 | 0 | 0 | 0 | 0 | 1 | 1 | 1 | 1 |
| 10 | 0 | 0 | 0 | 0 | 0 | 0 | 0 | 0 | 0 | 0 | 1 | 1 |
| 11 | 0 | 0 | 0 | 0 | 0 | 0 | 0 | 0 | 0 | 0 | 1 | 1 |
| 12 | 0 | 0 | 0 | 0 | 0 | 0 | 0 | 0 | 0 | 0 | 1 | 1 |
| 13 | 0 | 0 | 0 | 0 | 0 | 0 | 0 | 0 | 0 | 0 | 0 | 1 |
| 14 | 0 | 0 | 0 | 0 | 0 | 0 | 0 | 0 | 0 | 0 | 0 | 1 |
| 15 | 0 | 0 | 0 | 0 | 0 | 0 | 0 | 0 | 0 | 0 | 0 | 1 |
| 16 | 0 | 0 | 0 | 0 | 0 | 0 | 0 | 0 | 0 | 0 | 0 | 1 |

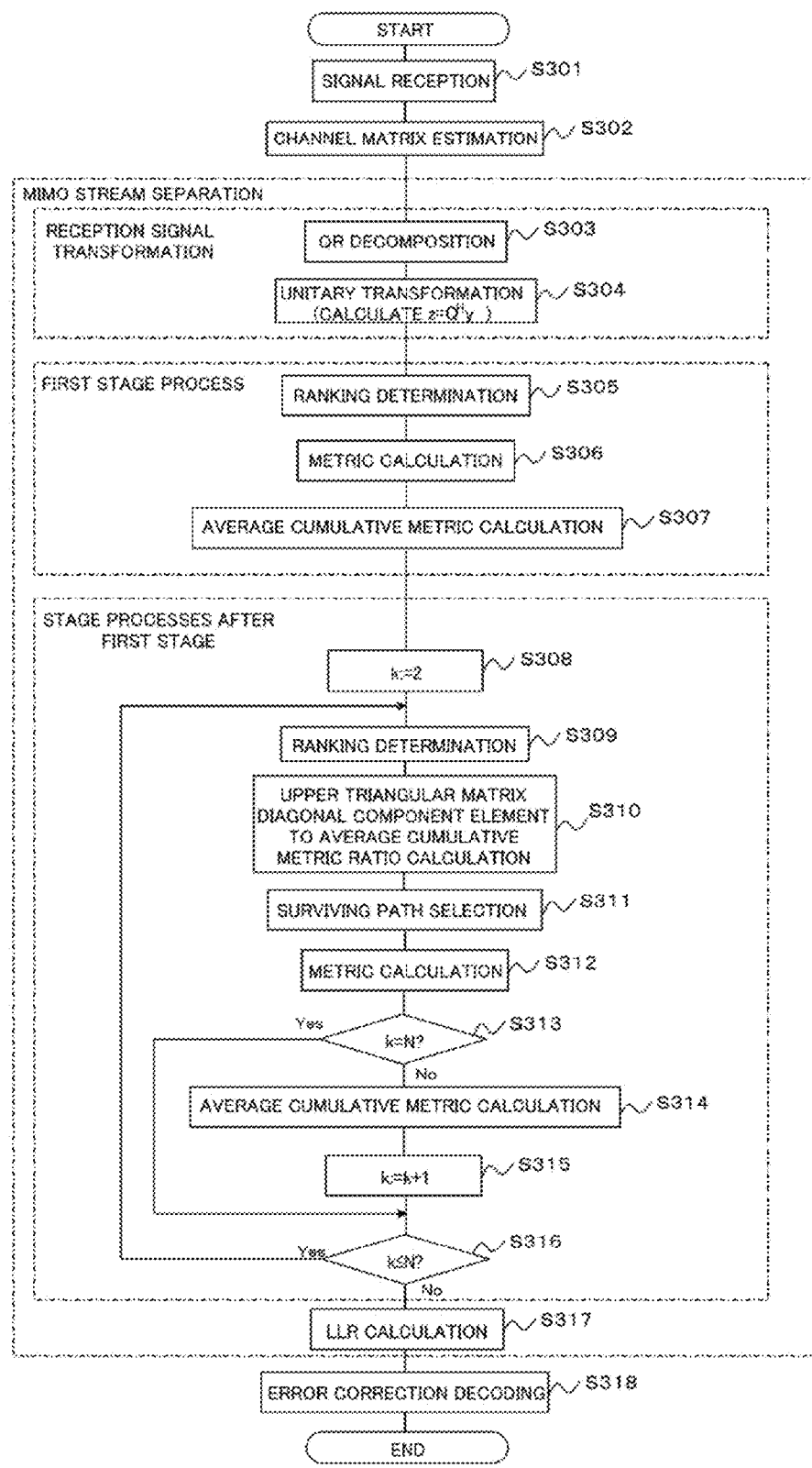

SIGNAL PROCESSING METHOD AND RECEIVER FOR WIRELESS COMMUNICATION SYSTEM

CROSS-REFERENCE TO RELATED APPLICATION

This application is based upon and claims the benefit of priority of the prior Japanese Application No. 2010-259303 filed on Nov. 19, 2010 in Japan, the entire contents of which are hereby incorporated by reference.

FIELD

The embodiments discussed herein are related to a signal processing method and a receiver. For example, signal processing methods and receivers which reproduce a plurality of transmission signals from a plurality of reception signals are included in the signal processing method and the receiver.

BACKGROUND

In recent years, investigation of a MIMO (Multiple Input Multiple Output) technique has been and is being carried out energetically as a next generation communication technique.

In the MIMO system, a plurality of data streams are transmitted from a transmitter including a plurality of transmission antennas and are separated and received by a receiver including a plurality of reception antennas.

An example of a configuration of the MIMO system is illustrated in FIG. 1.

The MIMO system 10 illustrated in FIG. 1 illustratively includes a transmitter 20 having a plurality of transmission antennas 21-1, 21-2, . . . , and 21-M (M is an integer equal to or higher than two) and a receiver 30 having a plurality of reception antennas 31-1, 31-2, . . . , and 31-N (N is an integer equal to or higher than two). It is to be noted that, in the following description, where the transmission antennas 21-1, 21-2, . . . and 21-M are not distinguished from each other, they are described simply as transmission antennas 21, and, where the reception antennas 31-1, 31-2, . . . and 31-M are not distinguished from each other, the reception antennas are described simply as reception antennas 31.

Further, in order to simplify the description, it is assumed as an example that the transmitter 20 transmits M data streams equal to the number of the transmission antenna 21 while the receiver 30 receives N reception signals equal to the number of the reception antenna 31. However, it is assumed that the following expression is satisfied:

$$M \leq N$$

Here, if a vector x of M rows and one column including M data streams $x_1$ to $x_M$ as component elements, a channel matrix H of N rows and M columns including propagation path gains $h_{\zeta\xi}$ between the $\xi$th ($1 \leq \xi \leq M$) transmission antennas and the $\zeta$th ($1 \leq \zeta \leq N$) reception antennas as component elements, a vector y of N rows and one column including reception signals $y_1$ to $y_N$ as component elements and a vector n of N rows and one column including noise $n_1$ to $n_N$ as component elements are defined, then the following expressions (1) and (2) are obtained:

$$y = Hx + n \quad (1)$$

$$\begin{pmatrix} y_1 \\ y_2 \\ \vdots \\ y_N \end{pmatrix} = \begin{pmatrix} h_{11} & h_{12} & \dots & h_{1,M} \\ h_{21} & h_{22} & \dots & h_{2,M} \\ \vdots & \vdots & \ddots & \vdots \\ h_{N,1} & h_{N,2} & \dots & h_{N,M} \end{pmatrix} \begin{pmatrix} x_1 \\ x_2 \\ \vdots \\ x_M \end{pmatrix} + \begin{pmatrix} n_1 \\ n_2 \\ \vdots \\ n_N \end{pmatrix} \quad (2)$$

Meanwhile, as a method for separating a data stream on the receiver 30 side, for example, an MMSE (Minimum Mean Square Error) method or an MLD (Maximum Likelihood Detection) method is available.

In the MMSE method, a data stream is separated by multiplying a received signal by a predetermined coefficient based on mean square error criteria.

In the MLD method, a metric such as a square Euclidean distance is calculated for combinations of all symbol replica candidates of a plurality of data streams and a combination of those symbol replica candidates which minimizes the total of the metrics is determined as a signal after the data stream separation.

By the MLD method, an excellent reception performance can be obtained in comparison with a linear separation method such as the MMSE method and so forth. However, if a modulation multi-value number of the lth ($1 \leq l \leq M$) transmission signal is represented by $g_l$, then the number of combinations of the symbol replica candidates is calculated by $$\prod_{l=1}^{M} g_l.$$

It is to be noted that, in the case of QPSK (Quadrature Phase Shift Keying), $g_1=4$, in the case of 16QAM (16 Quadrature Amplitude Modulation), $g_1=16$, and in the case of 64QAM, $g_1=64$.

Therefore, there is a case that, as the modulation level and the transmission data stream number increase, the number of times of calculation of the metric increases exponentially and the processing amount becomes enormous.

Therefore, various types of MLD methods have been proposed to reduce mathematical operation amount.

For example, in Non-Patent Document 1 listed below, a QRM-MLD (complexity-reduced Maximum Likelihood Detection with QR decomposition and the M-algorithm) method which is a combination of QR decomposition and the M-algorithm has been proposed.

In the QRM-MLD method, a metric such as a square Euclidean distance of all of symbol replica candidates with regard to surviving symbol replica candidates in the preceding stage is calculated.

Where the number of surviving symbol replica candidates in the kth (k=1, 2, . . . , M) stage is represented by $S_k$, the number of times of calculation of the metric by the QRM-MLD method is calculated by the following expression:

$$g_1 + \sum_{k=1}^{M-1} g_{k+1} S_k$$

Meanwhile, in Non-Patent Document 2 listed below, an ASESS (Adaptive SElection of Surviving Symbol replica candidates based on the maximum reliability) method in which a further reduction method of the number of times of calculation of a metric is applied to the QRM-MLD method is disclosed.

According to the ASESS method, symbol replica candidates in each stage are ranked by quadrant decision and calculation of a metric is carried out by the number of surviving symbol replica candidates in order beginning with a symbol replica candidate whose cumulative value (sum total) of the metric is low.

Accordingly, the number of times of calculation of the metric in the ASESS method is calculated by the following expression:

$$\sum_{k=1}^{M} S_k$$

In this manner, in the ASESS method, the number of times of calculation of a metric increases linearly with respect to the number of transmission data streams.

Further, in Patent Document 1 listed below, a method is proposed in which a plurality of transmission signal candidates are narrowed down stepwise by a predetermined number based on a proximity signal point data table which stores a corresponding relationship between estimated transmission signals of individual transmission systems and signal points which exhibit a short inter-signal point distance on a transmission constellation.

[Patent Document 1] Japanese Patent Laid-Open No. 2006-222872

[Non-Patent Document 1] K. J. Kim and J. Yue, "Joint channel estimation and data detection algorithms for MIMO-OFDM systems," in Proc. Thirty-Sixth Asilomar Conference on Signals, Systems and Computers, pp. 1857-1861, November 2002

[Non-Patent Document 2] K. Higuchi, H. Kawai, N. Maeda and M. Sawahashi, "Adaptive Selection of Surviving Symbol Replica Candidates Based on Maximum Reliability in QRM-MLD for OFCDM MIMO Multiplexing," Proc. of IEEE Globecom 2004, pp. 2480-2486, November 2004

SUMMARY (1) According to an aspect of the embodiment, a method includes a signal processing method for a wireless communication system including a transmitter which transmits a wireless signal using M transmission antennas and a receiver which receives the wireless signal using N reception antennas, M and N individually being integers equal to or greater than two, comprising performing QR decomposition of a channel matrix between the transmitter and the receiver into products of an orthogonal matrix Q and an upper triangular matrix R, calculating products $Q^H y$ of $Q^H$ which is Hermite conjugate of the orthogonal matrix Q and a reception column vector y including N reception signals received by the receiver as component elements, calculating a signal corresponding to a component element of an Mth row of a transmission column vector x, which includes M transmission signals as component elements, based on the calculated products $Q^H y$ and the upper triangular matrix R, selecting a plurality of transmission signal candidates regarding the component element of the Mth row of the transmission column vector x which are ranked in response to an inter-signal point distance with the signal calculated on a constellation by carrying out a region decision on the constellation regarding the calculated signal, selecting a number of transmission signal candidates corresponding to predetermined parameters based on the inter-signal point distances between the plural transmission signal candidates and the signals from the plural transmission signal candidates regarding component elements of the (M−1)th to 1st rows of the transmission column vector x by carrying out a region decision on the constellation regarding signals corresponding to the component elements of the (M−1)th to 1st rows of the transmission column vector x based on the calculated products $Q^H y$, the upper triangular matrix R and the selected plural transmission signal candidates, and reproducing the M transmission signals by determining a unique set of the transmission signal candidates regarding the component elements of the Mth to 1st rows of the transmission column vector x based on the sum total of the inter-signal point distances between the selected transmission signal candidates and the signals, can be used.

(2) According to an aspect of the embodiment, a method includes a signal processing method for a wireless communication system including a transmitter which transmits a wireless signal using M transmission antennas and a receiver which receives the wireless signal using N reception antennas, M and N individually being integers equal to or greater than two, comprising generating, based on electric power values of column component elements which configure a channel matrix between the transmitter and the receiver, a transformation channel matrix in which the column component elements are re-arranged, performing QR decomposition of the generated transformation channel matrix into products between an orthogonal matrix Q and an upper triangular matrix R, calculating a signal corresponding to a component element of an Mth row of a transmission column vector x, which includes M transmission signals as component elements, based on the calculated products $Q^H y$ and the upper triangular matrix R, selecting a plurality of transmission signal candidates regarding the component element of the Mth row of the transmission column vector x which are ranked in response to an inter-signal point distance with the signal calculated on a constellation by carrying out a region decision on the constellation regarding the calculated signal, selecting a number of transmission signal candidates corresponding to predetermined parameters based on the inter-signal point distances between the plural transmission signal candidates and the signals from the plural transmission signal candidates regarding component elements of the (M−1)th to 1st rows of the transmission column vector x by carrying out a region decision on the constellation regarding signals corresponding to the component elements of the (M−1)th to 1st rows of the transmission column vector x based on the calculated products $Q^H y$, the upper triangular matrix R and the selected plural transmission signal candidates, and reproducing the M transmission signals by determining a unique set of the transmission signal candidates regarding the component elements of the Mth to 1st rows of the transmission column vector x based on the sum total of the inter-signal point distances between the selected transmission signal candidates and the signals, can be used.

(3) According to an aspect of the embodiment, an apparatus includes a receiver for a wireless communication system which includes a transmitter which transmits a wireless signal using M transmission antennas and the receiver which receives the wireless signal using N reception antennas, M and N individually being integers equal to or greater than two, comprising a QR decomposition processor that performs QR decomposition of a channel matrix between the transmitter and the receiver into products between an orthogonal matrix Q and an upper triangular matrix R, a unitary transformer that calculates products $Q^H y$ between $Q^H$ which is Hermite conjugate of the orthogonal matrix Q calculated by the QR decomposition processor and a reception column vector y including N reception signals received by the receiver as component elements, and a signal reproducer that calculates a signal corresponding to a component element of the Mth row of a transmission column vector x, which includes M transmission signals as component elements, based on the products $Q^H y$ calculated by the unitary transformer and the upper triangular matrix R, selects a plurality of transmission signal candidates regarding component elements of the Mth row of the transmission column vector x, which are ranked in response to an inter-signal point distance with the signal calculated on a constellation by carry out a region decision on the constellation regarding the calculated signal, selects a number of transmission signal candidates corresponding to predetermined parameters based on inter-signal point distances between the plural transmission signal candidates and the signals from the plural transmission signal candidates regarding component elements of the (M−1)th to 1st rows of the transmission column vector x by carrying out a region decision on the constellation regarding signals corresponding to the component elements of the (M−1)th to 1st rows of the transmission column vector x based on the calculated products $Q^H y$, the upper triangular matrix R and the selected plural transmission signal candidates, and reproduces the M transmission signals by determine a unique set of the transmission signal candidates regarding the component elements of the Mth to 1st rows of the transmission column vector x based on the sum total of the inter-signal point distances between the selected transmission signal candidates and the signals, can be used.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 3 is a diagrammatic view illustrating another example of a search for a surviving path by the ASESS method;

FIG. 7 is a view illustrating an example of a ranking table corresponding to the region decision illustrated in FIG. 6;

FIG. 9 is a view illustrating g an example of a ranking table corresponding to the region decision illustrated in FIG. 8;

FIGS. 10 to 12 are views illustrating an example of quadrant decision where 64QAM is used as a modulation method;

FIG. 13 is a view illustrating an example of a table for surviving path selection according to the embodiment;

FIG. 20 is a flow chart illustrating an example of operation of a receiver according to the second modification.

DESCRIPTION OF EMBODIMENTS

Figure 1:
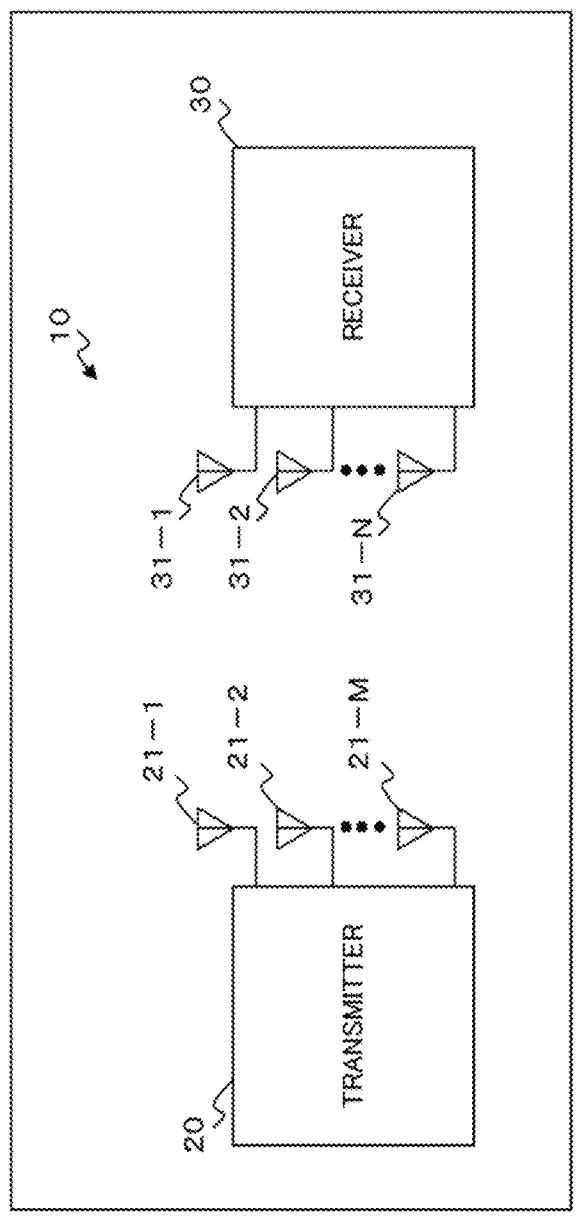
FIG. 1 is a schematic view illustrating an example of a configuration of a MIMO system.

First, the ASESS method mentioned hereinabove is described. It is to be noted that, in order to simplify the description, a case in which M=N is taken as an example also here.

In the ASESS method, a channel matrix H is QR decomposed into a unitary matrix Q and an upper triangular matrix R as given by the following expression (3):

$$H = QR = \begin{pmatrix} q_{11} & q_{12} & \cdots & q_{1,N} \\ q_{21} & q_{22} & \cdots & q_{2,N} \\ \vdots & \vdots & \ddots & \vdots \\ q_{N,1} & q_{N,2} & \cdots & q_{N,N} \end{pmatrix} \begin{pmatrix} r_{11} & r_{12} & \cdots & r_{1,N} \\ & r_{22} & \cdots & r_{2,N} \\ & & \ddots & \vdots \\ O & & & r_{N,N} \end{pmatrix} \quad (3)$$

where 0 represents a zero matrix.

Then, if the reception signal y represented in the expressions (1) and (2) is multiplied by an Hermite conjugate $Q^H$ of the unitary matrix Q from the left, then the following expressions (4) and (5) are obtained:

$$z = Q^H y = Q^H QRx + Q^H n = Rx + n' \quad (4)$$

$$\begin{pmatrix} z_1 \\ z_2 \\ \vdots \\ z_N \end{pmatrix} = \begin{pmatrix} r_{11} & r_{12} & \cdots & r_{1,N} \\ & r_{22} & \cdots & r_{2,N} \\ & & \ddots & \vdots \\ O & & & r_{N,N} \end{pmatrix} \begin{pmatrix} x_1 \\ x_2 \\ \vdots \\ x_N \end{pmatrix} + \begin{pmatrix} n'_1 \\ n'_2 \\ \vdots \\ n'_N \end{pmatrix} \quad (5)$$

In this manner, the reception signal can be orthogonalized.

First, in the first stage in the ASESS method, region decision on the constellation is carried out regarding a row in the lowest stage of the expression (5):

$$z_N / r_{N,N}$$

and ranking of candidate replicas $C_{N,\eta}$ of a transmission signal $x_N$ is carried out. It is to be noted, however, the following expression is satisfied:

$$\eta = 1, \ldots, g_N$$

Here, the number of candidate replicas of the ith rank in the ranking regarding the transmission signal $x_N$ is represented by $\rho^{(1)}(i)$. Further, a surviving path in the first stage is represented by $\Pi_l^{(l)}(i) = \rho^{(l)}(i)$. However, where a surviving path is represented by $\Pi^{(k)}(i)$, this represents that the surviving path is the ith surviving path in the kth stage. On the other hand, where a surviving path is represented by $\Pi_\kappa^{(k)}(i)$, this represents the path in the κth stage (κ=1, 2, ..., k) of the ith surviving path in the kth stage.

Further, where a surviving path is represented by $\Pi_{a\sim b}^{(k)}(i)$ (where a<b), this represents a partial path from the ath stage to the bth stage of the ith surviving path in the kth stage.

For example, in the case of $$\Pi^{(4)} = \{(0,1,2,3),(0,2,1),(1,2,3,0),(2,0,0,1)\}$$

the surviving path is represented by $$\Pi^{(4)}(2) = (0,2,1,1)$$

$$\Pi_3^{(4)}(3) = 3$$

$$\Pi_{1\sim 3}^{(4)}(1) = (0,1,2)$$

Further, the number of candidate replicas equal to the surviving candidate number $S_1$ determined in the descending order of the rank in the ranking in the first stage is represented by $c_{N,\Pi_1^{(1)}(i)}$ (i=1, 2, ..., $S_1$).

Then, a number of candidate replicas equal to the surviving candidate number $S_1$ are selected in the descending order of the rank in the ranking, and the selected candidate replicas are determined as surviving paths in the first stage. Then, a metric such as a square Euclidean distance or the like is calculated.

Where the square Euclidean distance is applied as the metric of the surviving paths, the metric is calculated by the following expression:

$$d_1(\Pi_1^{(1)}(i)) = |z_N - r_{N,N} c_{N,\Pi_1^{(1)}(i)}|^2 \ (i=1,2,\ldots,S_1)$$

In the second stage, the candidate replicas $c_{N,\eta}$ of the $S_1$ surviving paths surviving in the first stage are cancelled (subtracted) from a unitary transformation signal $z_{N-1}$ regarding the second row from the bottom in the expression (5). Then, results of the cancellation are divided by diagonal component elements of the (N−1)th row of the upper triangular matrix R as given by the following expression:

$$u_{N-1}(\Pi_1^{(1)}(i)) = (z_{N-1} - r_{N-1,N} c_{N,\Pi_1^{(1)}(i)})/r_{N-1,N-1} \ (i=1,2,\ldots,S_1)$$

Then, region decision of the results of the division is carried out and ranking of the candidate replicas $c_{N-1,\eta}$ of the transmission signal $x_{N-1}$ is carried out.

It is to be noted that the number of a candidate replica of the jth rank in the ranking of $u_{N-1}(\Pi_1^{(1)}(i))$ is represented as $$\rho_{\Pi_1^{(1)}(i)}^{(2)}(j).$$

Further, in the ASESS method, a surviving path after the second stage is adaptively selected in the following manner.

First, values of $$e(i) := d_1(\Pi_1^{(i)}(i))$$

$$P(i) := 1$$

$$v := 1$$

are set as initial values.

Then, a candidate replica $$\rho_{\Pi_1^{(1)}(i_{min})}^{(2)}(P(i_{min})), \ i_{min} = \arg(\min[e(i)])$$

of the $P(i_{min})$th rank in the ranking of $i_{min}$ with which e (i) exhibits a minimum value while P (i) is not P (i)=$g_{N-1}$ is selected, and a cumulative metric up to the second stage represented by the following expression (6) is calculated:

$$d_2\!\left(\Pi_1^{(1)}(i_{min}), \rho_{\Pi_1^{(1)}(i_{min})}^{(2)}(P(i_{min}))\right) = d_1(\Pi_1^{(1)}(i_{min})) + \left|z_{N-1} - r_{N-1,N} c_{N,\Pi_1^{(1)}(i_{min})} - r_{N-1,N-1} c_{N-1,\rho_{\Pi_1^{(1)}(i_{min})}^{(2)}(P(i_{min}))}\right|^2 \quad (6)$$

Then, the parameters are updated as given below:

$$e(i_{min}) := d_2\!\left(\Pi_1^{(1)}(i_{min}), \rho_{\Pi_1^{(1)}(i_{min})}^{(2)}(P(i_{min}))\right)$$

$$P(i_{min}) := P(i_{min}) + 1$$

$$v := v + 1$$

Then, the with surviving path in the second stage is determined by $$\Pi_1^{(2)}(v) = \Pi_1^{(1)}(i_{min})$$

$$\Pi_2^{(2)}(v) = \rho_{\Pi_1^{(1)}(i_{min})}^{(2)}(P(i_{min}))$$

The processes described above are carried out until the number of surviving paths in the second stage becomes equal to a surviving path number $S_2$.

In the kth (k=3, ..., N) stage later than the second stage, candidate replicas of $S_{k-1}$ surviving paths surviving in the (k−1)th stage are cancelled from the kth reception signal $z_{N-k+1}$ from the bottom.

Then, results of the cancellation are divided by diagonal component elements of the (N−k+1)th row of the upper triangular matrix R as given by $$u_{N-k+1,i}(\Pi^{(k-1)}(i)) = \left(z_{N-k+1} - \sum_{p=1}^{k-1} r_{N-k+1,N-p+1} c_{N-p+1,\Pi_p^{(k-1)}(i)}\right) \Big/ r_{N-k+1,N-k+1}$$

$$(i = 1, 2, \ldots, S_{k-1})$$

and then region decision is carried out for the results of the decision. Then, ranking of the candidate replicas of the transmission signal $x_{N-k+1}$ is carried out.

The surviving paths in the kth stage are adaptively selected in the following manner. First, as an initial condition, $$e(i) := d_{k-1}(\Pi^{(k-1)}(i))$$

$$P(i) := 1$$

$$v := 1$$

are set.

Then, a candidate replica $$\rho_{\Pi^{(k-1)}(i_{min})}^{(k)}(P(i_{min})), \ i_{min} = \arg(\min[e(i)])$$

of the P($i_{max}$)th rank in the ranking of $i_{min}$ with which e(i) exhibits a minimum value while P(i) is not P(i)=$g_{N-k+1}$ is selected, and a cumulative metric up to the second stage represented by the following expression (7) is calculated:

$$d_k\left(\Pi^{(k-1)}(i_{min}), \rho^{(k)}_{\Pi^{(k-1)}(i_{min})}(P(i_{min}))\right) = \tag{7}$$

$$d_{k-1}(\Pi^{(k-1)}(i_{min})) + \left| z_{N-k+1} - \sum_{p=1}^{k-1} r_{N-k+1,N-p+1} C_{N-p+1,\Pi_p^{(k-1)}(i)} - \right.$$

$$\left. r_{N-k+1,N-k+1} C_{N-k+1,\rho^{(k)}_{\Pi^{(k-1)}(i_{min})}(P(i_{min}))} \right|^2$$

Then, the parameters are updated as given below:

$$e(i_{min}) := d_k\left(\Pi^{(k-1)}(i_{min}), \rho^{(k)}_{\Pi^{(k-1)}(i_{min})}(P(i_{min}))\right)$$

$$P(i_{min}) := P(i_{min}) + 1$$

$$v := v + 1$$

Then, the with surviving path in the kth stage is determined by $$\Pi^{(k)}_{1\sim k-1}(v) = \Pi^{(k-1)}(i_{min})$$

$$\Pi^{(k)}_k(v) = \rho^{(k)}_{\Pi^{(k-1)}(i_{min})}(P(i_{min}))$$

The processes described above are carried out until the number of surviving paths in the kth stage becomes equal to the surviving path number $S_k$.

An example of a search for a surviving path according to the ASESS method is illustrated in FIGS. 2A to 2D.

Figure 2A:
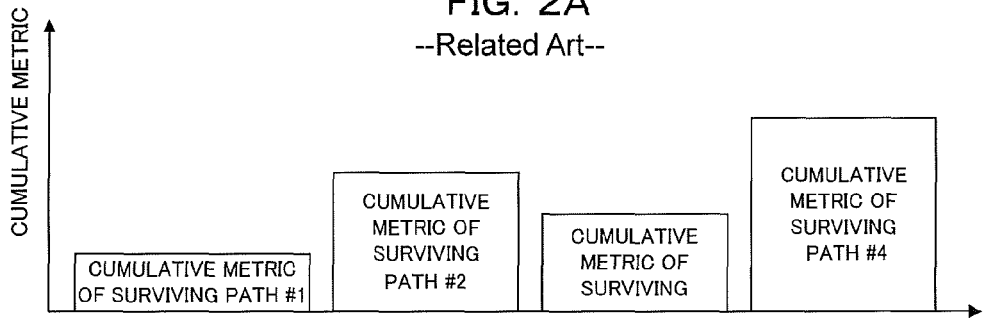
FIGS. 2A to 2D are diagrammatic views illustrating an example of a search for a surviving path by an ASESS method.

As illustrated in FIG. 2A, a minimum value search of a cumulative metric is carried out regarding surviving paths #1 to #4 in the preceding stage. In the example of FIG. 2A, the surviving path #1 is detected.

Figure 2B:
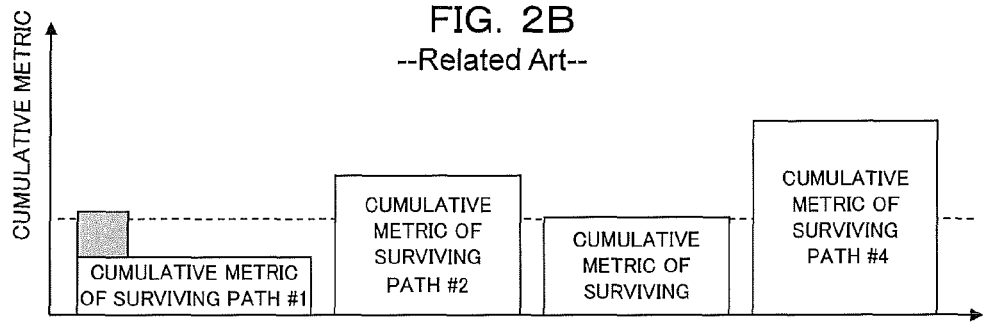

Then, as illustrated in FIG. 2B, to the surviving path #1 detected by the minimum value search, a candidate of the first rank in the ranking of the surviving path #1 is added (refer to a shaded portion in FIG. 2B).

Figure 2C:
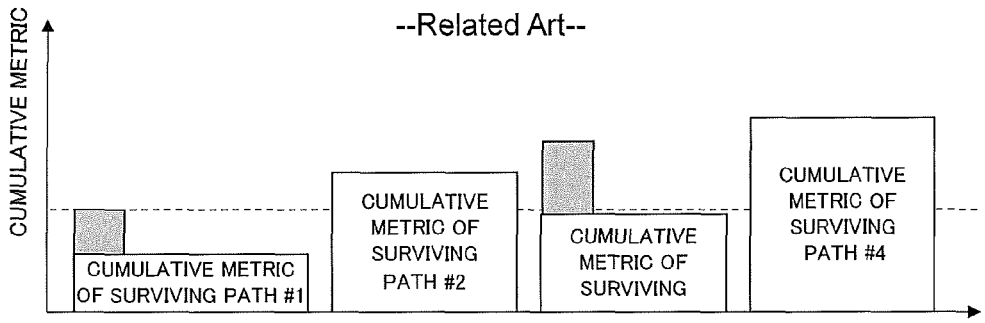

Then, as illustrated in FIG. 2C, the minimum value search is carried out for the cumulative metric value of the surviving path #1 to which the candidate of the first rank in the ranking is added and cumulative metrics of the surviving paths #2 to #4. In this instance, the surviving path #3 is selected and, a candidate of the first rank in the ranking of the surviving path #3 is added to the surviving path #3.

Figure 2D:
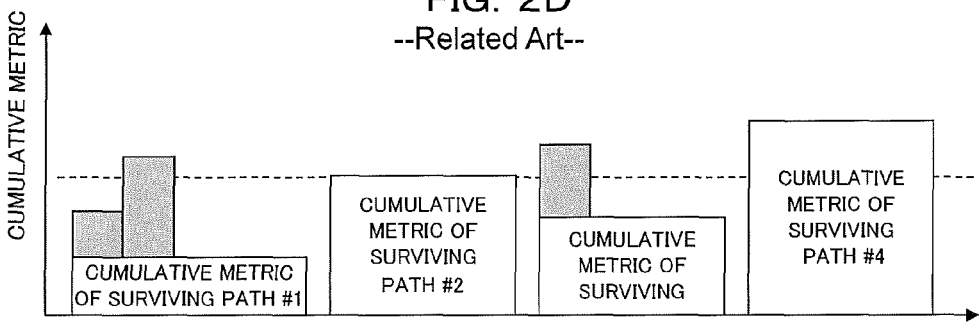

Similarly, as illustrated in FIG. 2D, the minimum value search of a cumulative metric is carried out. In this instance, the surviving path #1 is selected and a candidate of the second rank in the ranking of the surviving path #1 is added to the surviving path #1.

In this manner, in the ASESS method, an algorithm for adaptively searching for a surviving path is adopted. Therefore, a minimum value search for a number of elements equal to that of surviving paths in the preceding stage is carried out by a number of times equal to that of surviving paths in the present stage.

However, there is a case in which a magnitude comparison process necessary for the minimum value search must be carried out by a great number of times. The number of times of the magnitude comparison process in the kth stage is $S_{k-1}S_k$.

Further, the search algorithm for a surviving path is a sequential algorithm which depends upon the magnitude of a cumulative metric regarding a candidates added in the past as illustrated in FIG. 3.

In the example illustrated in FIG. 3, a minimum value search is carried out at time t1 and a candidate of the first rank in the ranking of the surviving path #1 is added.

Then, the cumulative metric of the added candidate is calculated at next time t2, and which surviving path is to be selected subsequently branches depending upon a result of the calculation.

As indicated by a branch A of FIG. 3, where the cumulative metric of the surviving path #3 exhibits a minimum value as a result of the minimum value search at time t2, a candidate of the first rank in the ranking of the surviving path #3 is selected at time t3.

On the other hand, as indicated by another branch B of FIG. 3, where the cumulative metric of the surviving path #1 exhibits a minimum value as a result of the minimum value search, a candidate of the second rank in the ranking of the surviving path #1 is added at time t3.

In such repetitive processing as described above, since the processing substance depends upon a preceding processing result, parallelization of processes is difficult in inplementation by hardware or software. Therefore, in order to complete the processing within required processing time, it is demanded to increase the speed of the operation clock frequency. However, if the operation clock frequency becomes high, then the power supply voltage becomes high and leakage current increases, and therefore, increase of power consumption is invited.

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus.

[1] Embodiment (1.1) Configuration of the MIMO System

Figure 4:
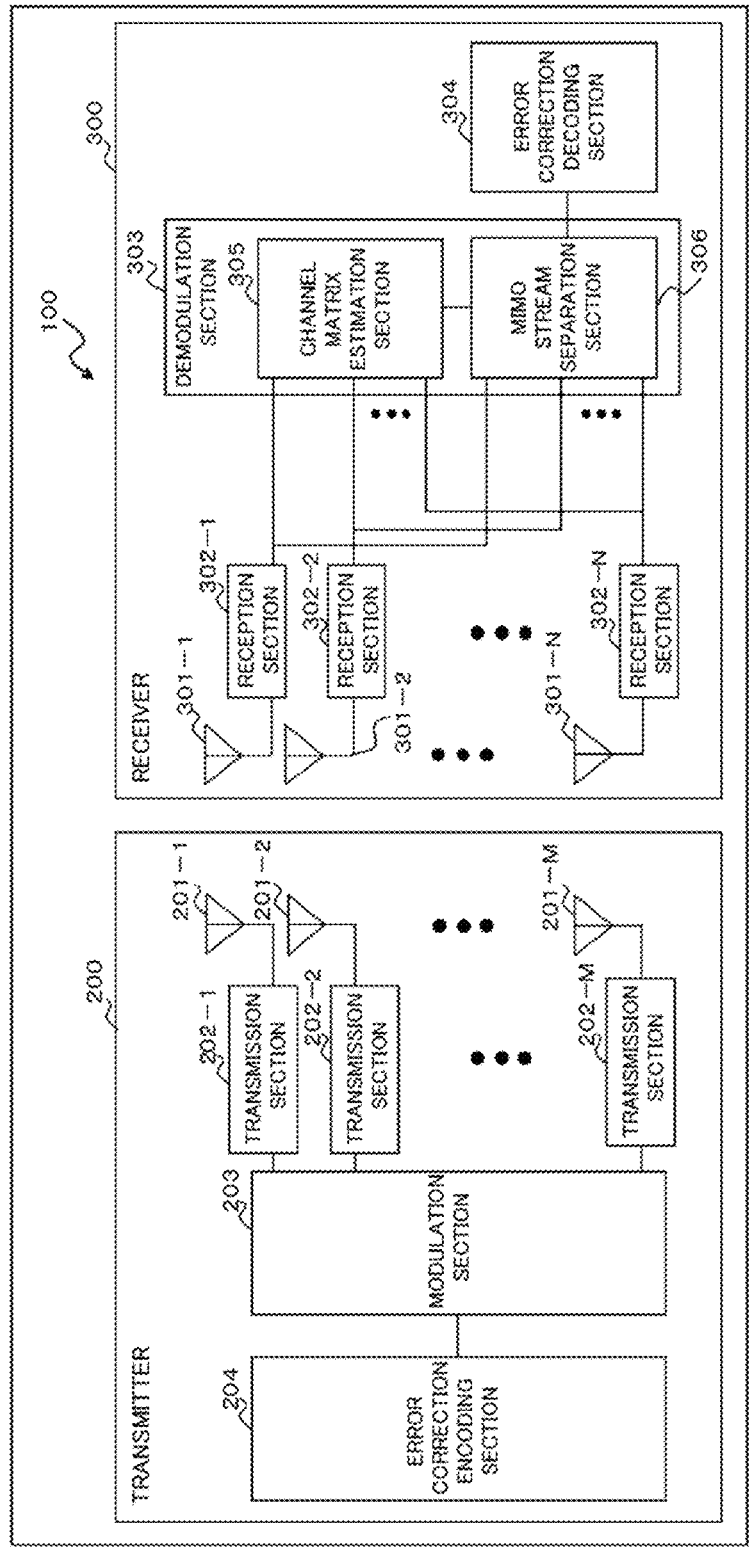
FIG. 4 is a block diagram illustrating an example of a configuration of a MIMO system according to an embodiment.

An example of a configuration of a MIMO system according to an embodiment is illustrated in FIG. 4. The MIMO system 100 illustrated in FIG. 4 illustratively includes a transmitter 200 and a receiver 300.

The transmitter 200 carries out a predetermined transmission process for transmission data and transmits the transmission data, for which the predetermined transmission process has been carried out, using M (M is an integer equal to or higher than two) transmission antennas.

To this end, the transmitter 200 illustratively includes transmission antennas 201-1, 201-2, ..., and 201-M, transmission sections 202-1, 202-2, ..., and 202-M, a modulation section 203, and an error correction encoding section 204. It is to be noted that, in the following description, where the transmission antennas 201-1, 201-2, ..., and 201-M are not individually distinguished from each other, the transmission antennas are described simply as transmission antennas 201, and, where the transmission sections 202-1, 202-2, ..., and 202-M are not individually distinguished from each other, the transmission sections are described simply as transmission section 202.

The error correction encoding section 204 adds a predetermined error correction code to transmission data. The predetermined error correction code includes, for example, a convolution code, a turbo code and so forth. The transmission data to which the error correction code is added is inputted to the modulation section 203.

The modulation section 203 carries out a predetermined modulation process for the transmission data inputted thereto from the error correction encoding section 204 described above. As the modulation method, for example, QPSK (Quadrature Phase Shift Keying), 16QAM (Quadrature Amplitude Modulation), 64QAM and so forth are available. It is to be noted that, while the present embodiment is described in the following description taking the QPSK, 16QAM or 64QAM as an example, this is an example to the end and it is not intended to limit the modulation method to any specific modulation method.

The modulation section 203 in the present embodiment separates the transmission data, for which the predetermined modulation process has been carried out, into a plurality of data streams and inputs the separated data streams to the transmission section 202.

The transmission section 202 carries out a predetermined wireless transmission process for the signal inputted thereto from the modulation section 203 and transmits the signal, for which the predetermined wireless transmission process has been carried out, through the antenna 201. The predetermined wireless transmission process includes, for example, D/A (digital/analog) conversion, frequency conversion (up convert), signal amplification and so forth.

On the other hand, the receiver 300 receives the signal transmitted thereto from the transmitter 200 and carries out a predetermined reception process for the received signal to reproduce data.

To this end, the receiver 300 illustratively includes reception antennas 301-1, 301-2, ..., and 301-N (N is an integer equal to or higher than two), reception sections 302-1, 302-2, ..., and 302-N, a demodulation section 303, and an error correction decoding section 304. It is to be noted that, in the following description, where the reception antennas 301-1, 301-2, ..., and 301-N are not individually distinguished from each other, the reception antennas are described simply as reception antennas 301, and, where the reception sections 302-1, 302-2, ..., and 302-N are not individually distinguished from each other, the reception sections are described simply as reception section 302.

The reception section 302 carries out a predetermined wireless reception process for the signals received by the reception antennas 301. The predetermined wireless reception process includes signal amplification, frequency conversion (down convert), A/D (analog/digital) conversion and so forth. The signals for which the predetermined wireless reception process has been carried out are inputted to the demodulation section 303.

Here, a reception column vector y of N rows and 1 column which includes N reception signals received by the reception section 302 as component elements is represented, using a transmission column vector x of M rows and 1 column which includes M data streams $x_1$ to $x_M$ as component elements, a channel matrix H of N rows and M columns which includes propagation path gains h between the $\xi$th ($1 \leq \xi \leq M$) transmission antennas and the $\zeta$th ($1 \leq \zeta \leq N$) reception antennas as component elements and a noise column vector n of N rows and 1 column which includes noise $n_1$ to $n_N$ as component elements, by the following expressions (8) and (9):

$$y = Hx + n \tag{8}$$

$$\begin{pmatrix} y_1 \\ y_2 \\ \vdots \\ y_N \end{pmatrix} = \begin{pmatrix} h_{11} & h_{12} & \cdots & h_{1,M} \\ h_{21} & h_{22} & \cdots & h_{2,M} \\ \vdots & \vdots & \ddots & \vdots \\ h_{N,1} & h_{N,2} & \cdots & h_{N,M} \end{pmatrix} \begin{pmatrix} x_1 \\ x_2 \\ \vdots \\ x_M \end{pmatrix} + \begin{pmatrix} n_1 \\ n_2 \\ \vdots \\ n_N \end{pmatrix} \tag{9}$$

The demodulation section 303 carries out a predetermined demodulation process for the signals received by the reception section 302 to reproduce data.

To this end, the demodulation section 303 illustratively includes a channel estimation section 305 and a MIMO stream separation section 306.

The channel estimation section 305 extracts a known signal such as a pilot signal (reference signal) or the like from each of the reception signals and carries out a channel (propagation path) estimation process based on the extracted pilot signals or the like to obtain a channel matrix H. The estimated channel matrix H is inputted to the MIMO stream separation section 306.

The MIMO stream separation section 306 carries out a data reproduction process hereinafter described using the signals received by the reception section 302 and the channel matrix H estimated by the channel estimation section 305 and carries out a predetermined demodulation process for the reproduced signals. The signal obtained by the predetermined demodulation process is inputted to the error correction decoding section 304.

The error correction decoding section 304 carries out predetermined error correction decoding for the stream separated by the MIMO stream separation section 306.

Figure 5:
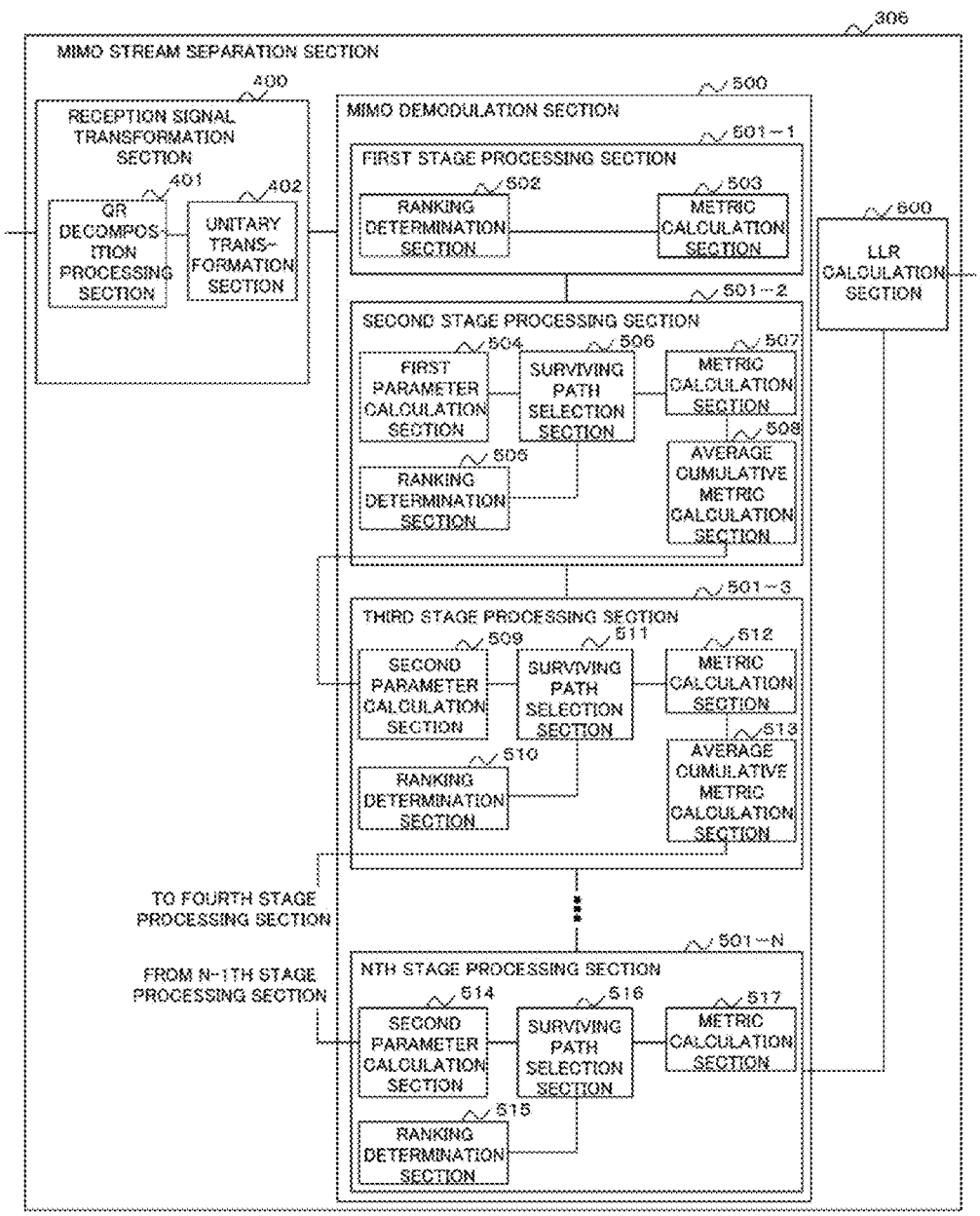
FIG. 5 is a block diagram illustrating an example of a configuration of a MIMO stream separation section illustrated in FIG. 4.

Here, an example of a configuration of the MIMO stream separation section 306 is illustrated in FIG. 5. The MIMO stream separation section 306 illustrated in FIG. 5 illustratively includes a reception signal transformation section 400, a MIMO demodulation section 500 and an LLR (Log Likelihood Ratio) calculation section 600.

The reception signal transformation section 400 carries out a transformation process for the reception signal y inputted thereto from the reception section 302 and the channel matrix H inputted thereto from the channel estimation section 305.

To this end, the reception signal transformation section 400 illustratively includes a QR decomposition processing section 401 and a unitary transformation section 402.

The QR decomposition processing section 401 carries out QR decomposition for the channel matrix H inputted thereto from the channel estimation section 305 to decompose the channel matrix H into a unitary matrix Q and an upper triangular matrix R as given by the following expression (10):

$$H = QR = \begin{pmatrix} q_{11} & q_{12} & \cdots & q_{1,N} \\ q_{21} & q_{22} & \cdots & q_{2,N} \\ \vdots & \vdots & \ddots & \vdots \\ q_{N,1} & q_{N,2} & \cdots & q_{N,N} \end{pmatrix} \begin{pmatrix} r_{11} & r_{12} & \cdots & r_{1,N} \\ & r_{22} & \cdots & r_{2,N} \\ & & \ddots & \vdots \\ O & & & r_{N,N} \end{pmatrix} \tag{10}$$

Here, by suitably selecting the unitary matrix Q, the diagonal component elements of the upper triangular matrix R can be set to positive real numbers. The unitary matrix Q is inputted to the unitary transformation section 402 while the upper triangular matrix R is inputted to the MIMO demodulation section 500. In particular, the QR decomposition processing section 401 functions as an example of a QR decomposition processor that performs QR decomposition of the channel matrix H between the transmitter 200 and the receiver 300 into products between the orthogonal matrix Q and the upper triangular matrix R.

The unitary transformation section 402 multiplies the reception column vector y received by the reception section 302 by an Hermite conjugate $Q^H$ of the unitary matrix Q obtained by the QR decomposition processing section 401 to obtain a unitary transformation vector z. At this time, a relationship represented by the following expressions (11) and (12) is satisfied between the unitary transformation vector z and the transmission column vector x:

$$z = Q^H y = Q^H QRx + Q^H n = Rx + n' \quad (11)$$

$$\begin{pmatrix} z_1 \\ z_2 \\ \vdots \\ z_N \end{pmatrix} = \begin{pmatrix} r_{11} & r_{12} & \cdots & r_{1,N} \\ & r_{22} & \cdots & r_{2,N} \\ & & \ddots & \vdots \\ O & & & r_{N,N} \end{pmatrix} \begin{pmatrix} x_1 \\ x_2 \\ \vdots \\ x_N \end{pmatrix} + \begin{pmatrix} n'_1 \\ n'_2 \\ \vdots \\ n'_N \end{pmatrix} \quad (12)$$

The unitary transformation vector z is inputted to the MIMO demodulation section 500. In particular, the unitary transformation section 402 functions as an example of a unitary transformer that calculates products $Q^H y$ between $Q^H$ which is the Hermite conjugate of the orthogonal matrix Q calculated by the QR decomposition processing section 401 and the reception column vector y including N reception signals received by the receiver 300 as component elements.

The MIMO demodulation section 500 divides a data reproduction process into N stages and carries out the divided processes. For example, the MIMO demodulation section 500 calculates a signal corresponding to a component element of the Mth row of the transmission column vector x, which includes M transmission signals as component elements, based on the product $Q^H y$ calculated by the unitary transformation section 402 and the upper triangular matrix R calculated by the QR decomposition section 401. The MIMO demodulation section 500 selects a plurality of transmission signal candidates regarding the component element of the Mth row of the transmission column vector x, which are ranked in response to an inter-signal point distance with the signal calculated on the constellation by carry out region decision on a constellation regarding the calculated signal to. The MIMO demodulation section 500 selects a number of transmission signal candidates corresponding to predetermined parameters based on the inter-signal point distances between the plural transmission signal candidates and the signals from the plural transmission signal candidates regarding the component elements of the (M−1)th to first rows of the transmission column vector x by carry out the region decision on the constellation regarding the signals corresponding to the component elements of the (M−1)th to first rows of the transmission column vector x based on the calculated product $Q^H y$, upper triangular matrix R and selected plural transmission signal candidates described hereinabove. The MIMO demodulation section 500 determines a unique set of ones of the transmission signal candidates regarding the component elements of the Mth to 1st rows of the transmission column vector based on the sum total of the inter-signal point distances between the selected transmission signal candidates and the signals. By executing the series of processes, the MIMO demodulation section 500 can function as an example of the signal reproduction section for reproducing M transmission signals.

To this end, the MIMO demodulation section 500 illustratively includes a first stage processing section 501-1, a second stage processing section 501-2, a third stage processing section 501-3, . . . , and an Nth stage processing section 501-N.

It is to be noted that the following description of the present embodiment is given using an example in which the MIMO demodulation section 500 carries out ranking for a plurality of transmission signal candidates regarding the component element of the Mth row of the transmission column vector x in the ascending order of the inter-signal point distance to the signal corresponding to the component element of the Mth row of the transmission column vector x and determines a unique set of ones of the transmission signal candidates regarding the component elements of the Mth to first rows of the transmission column vector so that the sum total of the inter-signal point distances between the selected transmission signal candidates and the signals exhibits a minimum value.

The first stage processing section 501-1 takes charge of a first stage of the data reproduction process and determines a symbol replica candidate of a transmission stream $x_N$ in the expression (12) described above.

To this end, the first stage processing section 501-1 illustratively includes a ranking determination section 502 and a metric calculation section 503.

The ranking determination section 502 of the first stage processing section 501-1 calculates, using the upper triangular matrix R outputted from the QR decomposition processing section 401 and the unitary transformation vector z outputted from the unitary transformation section 402, the following expression:

$$u_{N,\eta} = \frac{z_N}{r_{N,N}}$$

derived from the lowest stage of the expression (12) given hereinabove.

Then, by carrying out predetermined region decision on the constellation regarding the solutions $u_{N,\eta}$, the ranking is carried out in the ascending order of the distances between the solutions $u_{N,\eta}$ and the signal points of the modulation method used for transmission of the stream $x_N$.

It is to be noted that the modulation method used for the transmission may be configured such that the decision is carried out by the receiver 300 using the data transmitted from the transmitter 200, or the modulation method to be used for the transmission may be determined in advance while information regarding the modulation method is shared by the transmitter 200 and the receiver 300.

Here, the ranking of signal points by the ranking determination section 502 is described in detail below.

First, the positive or negative sign of the real part and the imaginary part of each solution $u_{N,\eta}$ is decided to decide to which quadrant the solution $u_{N,\eta}$ belongs. Then, the origin is moved to the center of the quadrant which is decided, by the first time decision, as a quadrant to which the solution $u_{N,\eta}$ belongs, and quadrant decision for the second time is carried out. By repetitively carrying out the processes described above by $N_{div}$ (at least $\log_4 g_1$) times, the region in which the solution $u_{N,\eta}$ exists can be decided from among $2^{2N_{div}}$ regions on the constellation of the modulation method used for the transmission of the stream $x_N$.

Figure 6:
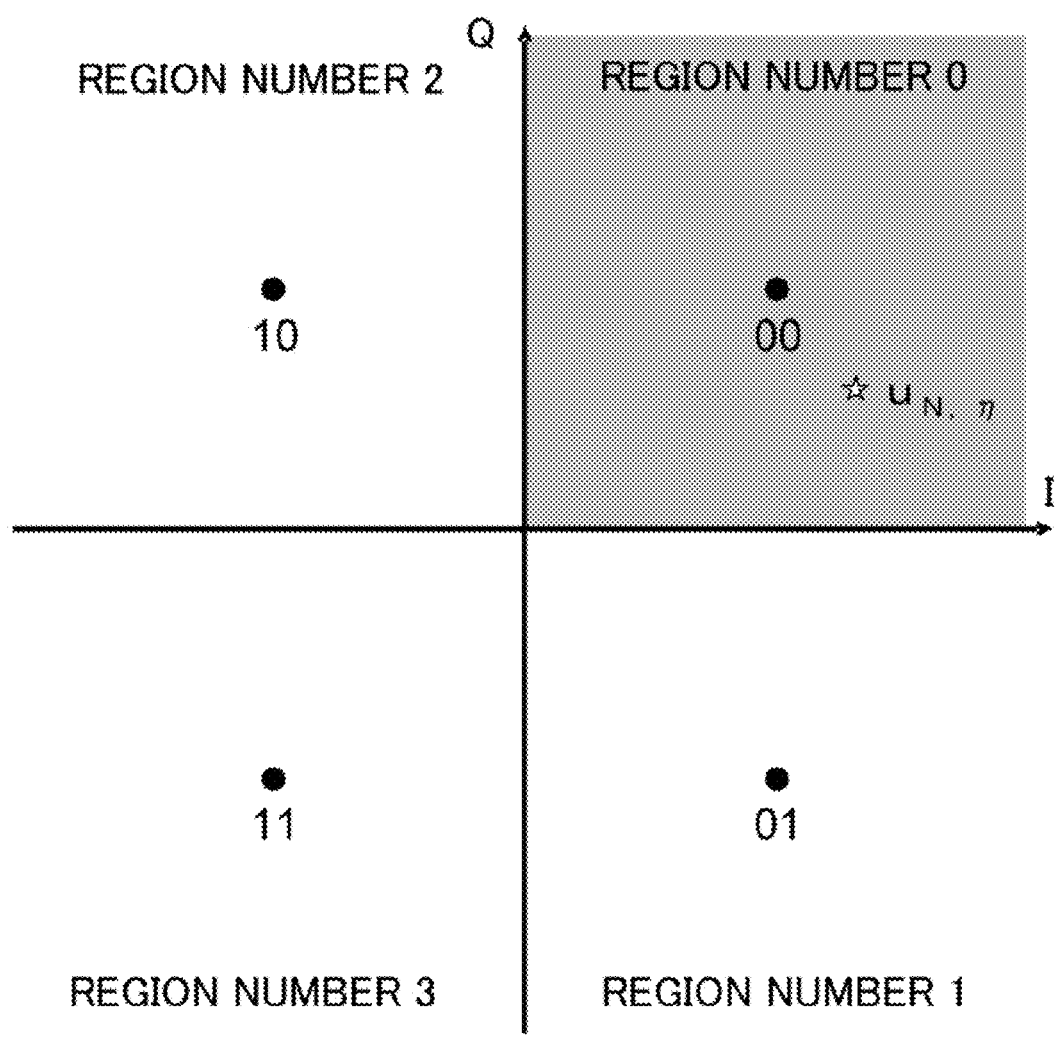
FIG. 6 is a view illustrating an example of region decision for the first time where QPSK is used as a modulation method.

An example of quadrant decision in the case of $N_{div}=1$ using the QPSK as the modulation method is illustrated in FIG. 6. It is to be noted that a region number is same as a number of a signal point included in each region. Further, the solution $u_{N,\eta}$ is represented by a star mark.

In the case of the example illustrated in FIG. 6, by carrying out the quadrant decision, it is decided that the solution $u_{N,\eta}$ exists in a region (first quadrant) of the region number 0.

Then, ranking of the signal points is carried out based on a result of the region decision described above. The signal points of the modulation method used for the transmission of the stream $x_N$ are ranked in the ascending order of the distance of the region decided by the region decision described above.

In the present embodiment, ranking of the signal points is determined by referring to a ranking table stored in a table or the like.

An example of the ranking table is illustrated in FIG. 7. Referring to a row of the region number 0 in FIG. 7, a signal point of the first rank in the ranking is 00 (decimal: 0); a signal point of the second rank in the ranking is 01 (decimal: 1); a signal point of the third rank in the ranking is 10 (decimal: 2); and a signal point of the fourth rank in the ranking is 11 (decimal: 3).

It is to be noted that, in the case of the example illustrated in FIG. 6, while it is not decided which one of the signal points 10 (decimal: 2) and 01 (decimal: 1) is nearer to the region decided by the region decision described above, alternatively it may be arbitrarily determined in advance which of the signal points is to be placed in a higher rank.

Further, also by increasing the number of times of repetition of the quadrant decision to enhance the accuracy of the ranking, the process described above can be made ready for the ranking.

Figure 8:
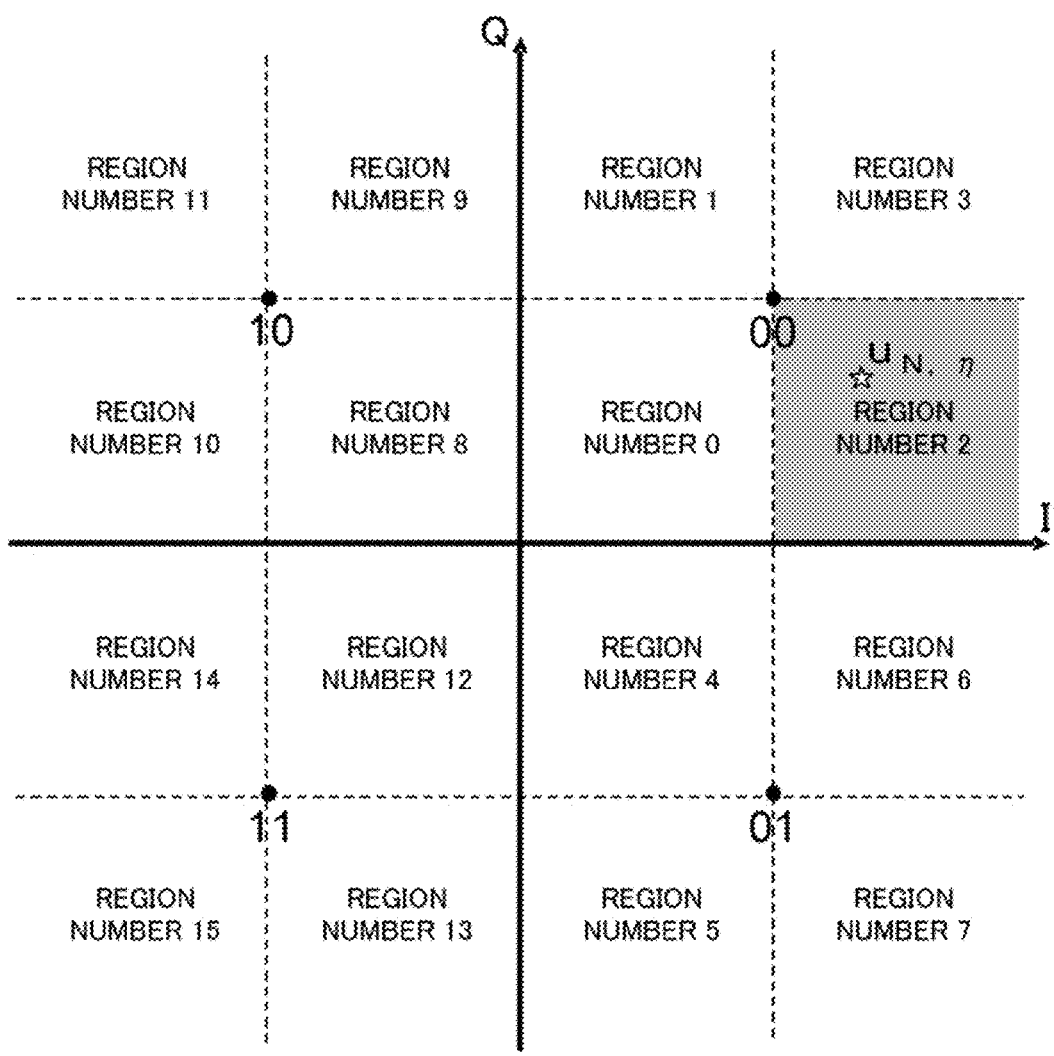
FIG. 8 is a view illustrating an example of region decision for the second time where the QPSK is used as a modulation method.

An example of the quadrant decision where $N_{div}=2$ using the QPSK as the modulation method is illustrated in FIG. 8.

In the case of the example illustrated in FIG. 8, it is decided by the quadrant decision that the solution $u_{N,\eta}$ exists in a region of the region number 2. Further, by referring to a row of the region number 2 in the ranking table of FIG. 9, a signal point of the first rank in the ranking is 00 (decimal: 0); a signal point of the second rank in the ranking is 01 (decimal: 1); a signal point of the third rank in the ranking is 10 (decimal: 2); and a signal point of the fourth rank in the ranking is 11 (decimal: 3).

Figure 10:
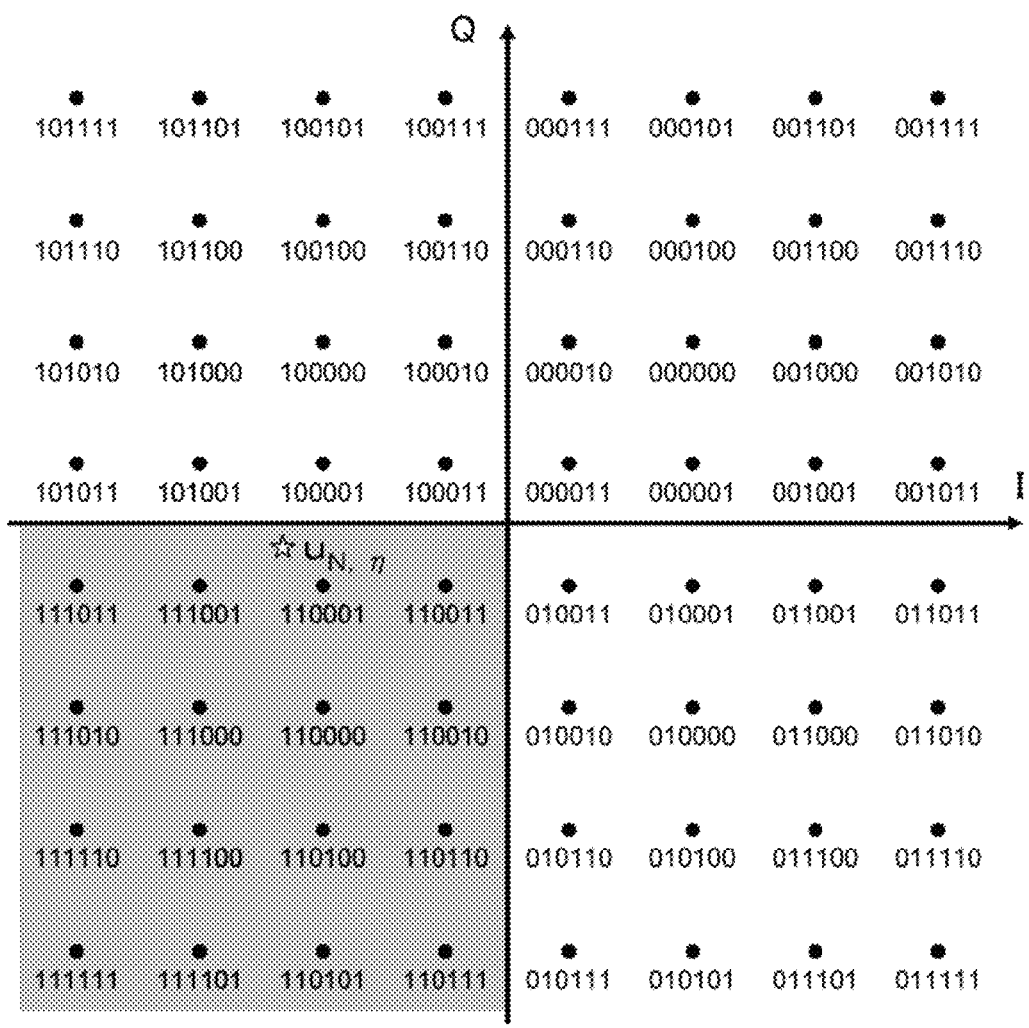
Figure 11:
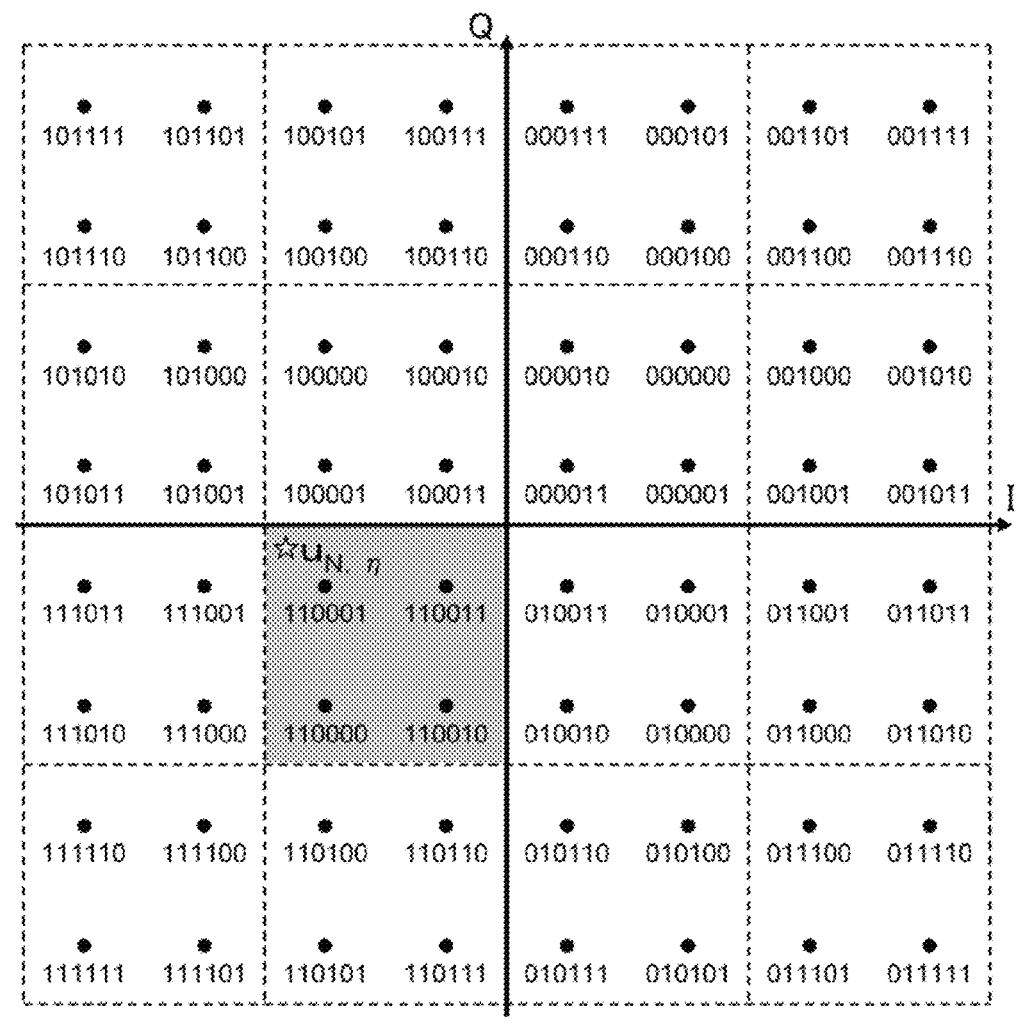

The series of operations of the quadrant decision is described with reference to FIGS. 10 to 12 taking the case of 64QAM as an example. It is to be noted that $N_{div}=3$.

First, in the quadrant decision for the first time, decision of the positive or negative sign of the real part and the imaginary part is carried out. As a result, it is decided that both of the real part and the imaginary part are negative as illustrated in FIG. 10, and it is decided that the solution $u_{N,\eta}$ exists in the third quadrant.

Then, since it is decided by the quadrant decision for the first time that the solution $u_{N,\eta}$ exists in the third quadrant, the origin is moved to $(-4/\sqrt{42},-4/\sqrt{42})$.

For the movement of the origin, a coordinate which is to become a next origin may be subtracted from the solution $u_{N,\eta}$. In particular, the subtraction of:

$$u_{N,\eta}^{(2)}=\{Re(u_{N,\eta})+4/\sqrt{42}\}+j\{Im(u_{N,\eta})-4/\sqrt{42}\}$$

is carried out.

Also as the quadrant decision for the second time, decision of the positive or negative sign of the real part and the imaginary part of $u_{N,\eta}^{(2)}$ is carried out similarly. As a result, the first quadrant is detected as illustrated in FIG. 11. Therefore, the origin is moved to $(-2/\sqrt{42},-2/\sqrt{42})$ similarly as in the decision for the first time.

Figure 12:
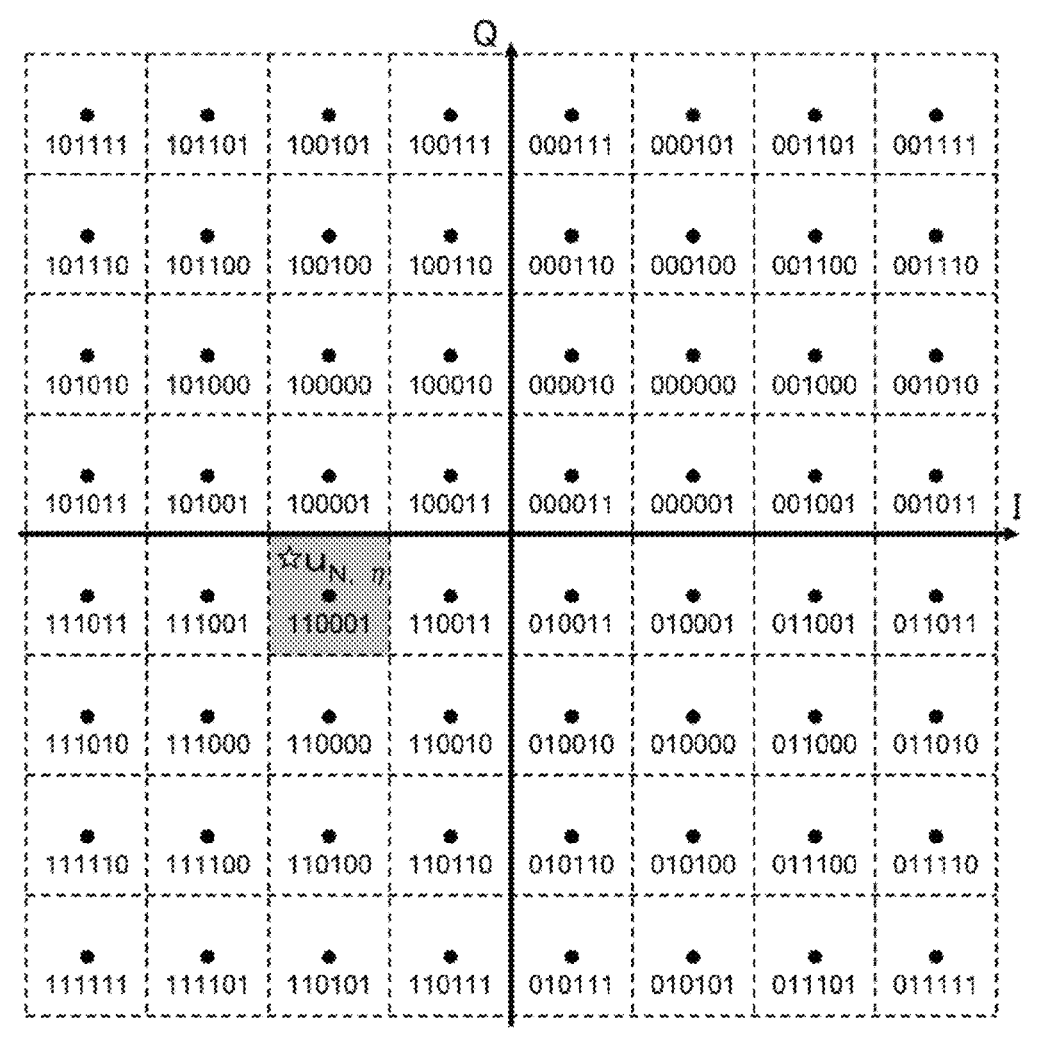

The quadrant decision for the third time is carried out similarly to the first and second decisions, and as a result, the second quadrant is detected as illustrated in FIG. 12.

From the forgoing, it is decided that the solution $u_{N,\eta}$ exists in a region of the region number 110001 (decimal: 49).

Then, the ranking is determined from the ranking table stored in the table or the like. Since the decided region number is 49, by referring to a ranking table in the case of 64QAM and $N_{div}=3$, it is decided that, for example, a region number of the first rank in the ranking is 110001 (decimal: 49); a region number of the second rank in the ranking is 100001 (decimal: 33); a region number of the third rank in the ranking is 110000 (decimal: 48); . . . .

It is to be noted that, while division is involved in the calculation of the solution $u_{N,\eta}$ in the process described above, if an expression $$u_{N,\eta}=z_N$$

is used and a coordinate to be used as the origin is set to $$(-4r_{N,N}/\sqrt{42},-4r_{N,N}/\sqrt{42}),(-2r_{N,N}/\sqrt{42},-2r_{N,N}/\sqrt{42})$$

then the division becomes unnecessary and the processing amount can be reduced.

Further, the number of the candidate replica of the ith rank in the ranking in the first stage determined as described above is represented by $\rho^{(1)}(i)$. A result of the ranking of the signal points is inputted to the metric calculation section 503.

The metric calculation section 503 calculates, using the upper triangular matrix R inputted from the QR decomposition processing section 401, unitary transformation vector z inputted from the unitary transformation section 401 and ranks of the signal points in the ranking inputted from the ranking determination section 502, a metric between the unitary transformation signal $z_N$ and the symbol replica candidates of the transmission signal $x_N$.

First, a number of candidate replicas equal to the surviving candidate number $S_1$ which have comparatively high ranks in the ranking obtained by the ranking determination section 502 are determined as surviving paths. Here, the surviving paths in the first stage are given by:

$$\Pi_1^{(1)}(i):=\rho^{(1)}(i)(i=1,2,\ldots S_1)$$

Then, a metric is calculated regarding the determined surviving paths. Where the square Euclidean distance is used as the metric, the metric is calculated by the following expression (13):

$$d_1(\Pi_1^{(1)}(i)=|z_N-r_{N,N}c_{N,\Pi_1^{(1)}(i)}|^2(i=1,2,\ldots,S_1)$$

Alternatively, the total of Manhattan distances given by the following expression (14) may be used as the metric.

$$d_1^{(manhattan)}(\Pi_1^{(1)}(i))=|Re(z_N-r_{N,N}c_{N,\Pi_1^{(1)}(i)})|+|IM(z_N-r_{N,N}c_{N,\Pi_1^{(1)}(i)})|(i=1,2,\ldots S_1) \qquad (14)$$

It is to be noted that, while the square Euclidean distance is used for calculation of the metric in the following description, the present embodiment is not limited to this but the Manhattan distance may be used instead. The calculated metric is inputted to a surviving path selection section 506 and a metric calculation section 507 of the second stage processing section 501-2.

The second stage processing section 501-2 takes charge of the second stage of the data reproduction process and determines symbol replica candidates of the transmission stream $x_{N-1}$ in addition to the transmission stream $x_N$. To this end, the second stage processing section 501-2 illustratively includes a parameter calculation section 504, a ranking determination section 505, a surviving path selection section 506, a metric calculation section 507 and an average cumulative metric calculation section 508.

The parameter calculation section 504 of the second stage calculates, in accordance with the upper triangular matrix R inputted from the QR decomposition section 401, a ratio $$\alpha = \frac{r_{N-1,N-1}}{r_{N,N}}$$

between diagonal component elements in the second row from the bottom of the upper triangular matrix R and diagonal component elements in the lowest stage. The calculated upper triangular matrix diagonal component element ratio $\alpha$ is inputted to the surviving path selection section 506.

The ranking determination section 505 cancels the symbol replicas of the surviving paths in the first stage from the unitary transformation signal $z_{N-1}$ inputted thereto from the unitary transformation section 402, and divides results of the cancellation by diagonal component elements of the (N−1)th row of the upper triangular matrix R. Then, the ranking determination section 505 carries out region decision of $$u_{N-1}(\Pi_1^{(1)}(i)) = \frac{z_{N-1} - r_{N-1,N} c_{N,\Pi_1^{(1)}(i)}}{r_{N-1,N-1}}$$

$(i = 1, 2, \ldots, S_1)$ obtained by the division and carries out ranking of the signal points. Since details of this are similar to those in the first stage, description of them is omitted.

It is to be noted that the number of a candidate replica of the jth rank in the ranking in the second stage with respect to the ith surviving path $\Pi^{(1)}(i)$ in the first stage is determined as $$\rho_{\Pi^{(1)}(i)}^{(2)}(j).$$

A result of the ranking of the signal points is inputted to the surviving path selection section 506.

The surviving path selection section 506 determines a selection method for surviving paths based on the upper triangular matrix diagonal component element ratio $\alpha$ inputted thereto from the first parameter calculation section 504 and selects a number of surviving paths $\Pi^{(2)}(i)$ equal to the surviving path number $S_2$ in the second stage based on the determined selection method of surviving paths and the result of the ranking inputted thereto from the ranking determination section 505.

Here, the surviving path selection method in a conventional technique is considered.

As described hereinabove with reference to FIG. 3, if the square Euclidean distance of a path to be added is great, then the possibility increases that a different path may be selected as the surviving path whose cumulative metric value exhibits a minimum value after the path is added. In particular, the possibility is high that also a path whose cumulative metric is great may be selected from among the surviving paths till the preceding stage (refer to branch A in FIG. 3).

On the other hand, if the square Euclidean distance of a path to be added is small, then the possibility increases that a cumulative metric value of the surviving path to which the path just described is added may exhibit a minimum value. In particular, the possibility is high that the path may be selected in order beginning with a path whose cumulative metric is small from among the surviving paths till the preceding stage (refer to the branch B in FIG. 3).

Therefore, since the surviving path selection section 506 changes the selection destination of a path based on the upper triangular matrix diagonal component element ratio $\alpha$ to decrease the number of times of the magnitude comparison process and does not successively select the surviving path as in the ASESS method, the speed of the processing can be increased by parallelization of the processes.

The cumulative metric value in the second stage is calculated by the following expression (15). Here, the first term on the right side of the expression (15) represents a square Euclidean distance of the path surviving in the first stage and the second term represents a square Euclidean distance of the path to be added in the second stage. Further, the expression (15) can be transformed into the following expression (16):

$$d_2(\Pi^{(2)}(i)) = \left| z_N - r_{N,N} c_{N,\Pi_1^{(2)}(i)} \right|^2 + \left| z_{N-1} - r_{N-1,N} c_{N,\Pi_1^{(2)}(i)} - r_{N-1,N-1} c_{N-1,\Pi_2^{(2)}(i)} \right|^2 \quad (15)$$

$$d_2(\Pi^{(2)}(i)) = r_{N,N}^2 \left\{ \left| \frac{z_N}{r_{N,N}} - c_{N,\Pi_1^{(2)}(i)} \right|^2 + \left( \frac{r_{N-1,N-1}}{r_{N,N}} \right)^2 \left| \frac{z_{N-1} - r_{N-1,N} c_{N,\Pi_1^{(2)}(i)}}{r_{N-1,N-1}} - c_{N-1,\Pi_2^{(2)}(i)} \right|^2 \right\} \quad (16)$$

As can be recognized from the expression (16) given above, the square Euclidean distance of the path to be added in the second stage varies in proportion to the ratio $$\frac{r_{N-1,N-1}}{r_{N,N}}$$

between the diagonal component elements at the lowest stage of the upper triangular matrix R and the second diagonal component elements from the bottom calculated, that is, $\alpha$.

Therefore, the number of paths to be added to a surviving path in the preceding stage is varied based on the value $\alpha$.

In particular, upon surviving path selection in the second stage, as the value $\alpha$ described above decreases, the number of paths which are to be selected from among the surviving paths whose cumulative metric in the first stage is small increases. On the contrary, as the value $\alpha$ increases, the number of paths which are to be selected also from among the surviving paths whose cumulative metric in the first stage is great increases.

Or, the number of paths to be added to a surviving path in the preceding stage may be varied based on a value $\alpha^2$.

Or else, the number of paths to be selected may be changed based on a ratio $$\beta_2 = \frac{r_{N-1,N-1}}{\frac{1}{S_1} \sum_{i=1}^{S_1} d_1(i)}$$

between an average value of the cumulative metric value in the first stage and the diagonal component elements of the second row from the bottom of the upper triangular matrix R.

In particular, as the value $\beta_2$ described above decreases, the number of paths which are to be selected from among the surviving paths whose cumulative metric in the first stage is small increases. On the contrary, as the value $\beta_2$ increases, the number of paths which are to be selected also from among the surviving paths whose cumulative metric in the first stage is great increases.

Or otherwise, the number of paths to be added to a surviving path in the preceding stage may be varied based on the value $\beta_2^2$.

Or else, the number of paths to be selected may be changed based on a ratio $$\beta'_2 = \frac{r_{N-1,N-1}}{\sqrt{\frac{1}{S_1}\sum_{i=1}^{S_1} d_1(i)}}.$$

Or else, the number of paths to be selected may be changed based on a value $\beta'^2_2$.

After the third stage, the number of selection paths can be changed based on a ratio $$\beta_k = \frac{r_{N-k+1,N-k+1}}{\frac{1}{S_{k-1}}\sum_{i=1}^{S_{k-1}} d_{k-1}(i)}$$

between an average value of the cumulative metric values till the preceding stage (k−1th stage) and the kth diagonal component elements from the bottom of the upper triangular matrix R. In particular, as the value $\beta_k$ described above decreases, the number of paths which are to be selected from among the surviving paths whose cumulative metric in the (k−1)th stage is small increases. On the contrary, as the value described above increases, the number of paths which are to be selected also from among the surviving paths whose cumulative metric in the (k−1)th stage is great increases.

Or, the number of selection paths may be changed based on a ratio $$\beta'_k = \frac{r_{N-k+1,N-k+1}}{\sqrt{\frac{1}{S_{k-1}}\sum_{i=1}^{S_{k-1}} d_{k-1}(i)}}.$$

Or, the number of selection paths may be changed based on a value $\beta'^2_k$.

In the present example, as an example of surviving path selection in the second stage, a surviving path selection table which previously indicates a relationship between values of the upper triangular matrix diagonal component element ratio $\alpha$ and the numbers of paths to be selected is searched, and $\sigma(i)$ candidate replicas of comparatively high ranks in the ranking in the second stage are selected as surviving paths regarding the surviving path having the ith lowest metric value in the first stage.

It is to be noted that the surviving path selection table is prepared such that, as the value $\alpha$ decreases, the number of paths which are to be selected from among the surviving paths whose cumulative metric in the preceding stage is small increases but, as the value $\alpha$ increases, the number of paths which are to be selected also from among the surviving paths whose cumulative metric in the preceding stage is great increases.

An example of the surviving path selection table where the number of surviving paths in the preceding stage is 16 and the number of surviving paths in the present stage is 16 is illustrated in FIG. 13.

Where the value of $\alpha$ is equal to or higher than 0 but is lower than 1, eight paths are selected from among the surviving paths whose cumulative metric in the preceding stage is the lowest; four paths are selected from among the surviving paths whose cumulative metric in the preceding stage is the second lowest; two paths are selected from among the surviving paths whose cumulative metric in the preceding stage is the third lowest; and two paths are selected from among the surviving paths whose cumulative metric in the preceding stage is the fourth lowest.

On the other hand, where the value $\alpha$ is equal to or higher than 15, one path is selected from the 16 surviving paths in the preceding stage.

Here, an algorithm for the surviving path selection in the second stage is described in detail.

First, surviving paths in the first stage sorted in the ascending order of the metric value $d_1$ in the first stage are determined as $\Pi^{(1),asc}(i)$.

Then, surviving paths in the second stage are selected using an algorithm given as

```
γ := 1
δ := 1
for (w:=1; w≤S₂; w:=w+1) {
    Π₁⁽²⁾(w) := Π₁⁽¹⁾,ᵃˢᶜ (γ)

Π₂⁽²⁾(w) := ρ⁽²⁾_{Π⁽¹⁾,asc(γ)}(δ)

δ := δ + 1
    if (w == σ(γ)) {
        γ := γ + 1
        δ := 1
    }
}
```

Further, $\sigma(i)$ paths of comparatively high ranks in the ranking may be selected from among the surviving paths of the ith rank in the ranking in the first stage. In particular, from the selection method described above, the sorting of the surviving paths in the first stage in accordance with the magnitude of the metric value $d_1$ in the first stage may be omitted to select surviving paths in the second stage as represented by

```
γ := 1
δ := 1
for (w := 1; w≤S₂; w:=w+1) {
    Π₁⁽²⁾(w) := Π₁⁽¹⁾ (γ)

Π₂⁽²⁾(w) := ρ⁽²⁾_{Π⁽¹⁾(γ)}(δ)

δ := δ + 1
    if (w==σ(γ)) {
        γ := γ + 1
        δ := 1
    }
}
```

The surviving paths selected here are inputted to the metric calculation section 507 and the ranking determination section 510 in the third stage.

The metric calculation section 507 calculates a metric regarding the surviving paths selected by the surviving path selection section 506 using the upper triangular matrix R inputted thereto from the QR decomposition section 401 and the unitary transformation vector z inputted thereto from the unitary transformation section 402. Then, the metric calculation section 507 calculates, using the metric inputted from the metric calculation section 503 in the first stage, a cumulative metric represented by the following expression (17):

$$d_2(\Pi^{(2)}(i)) = d_1(\Pi_1^{(2)}(i)) + |z_{N-1} r_{N-1,N} c_{N,\Pi_1^{(2)}(i)} - r_{N-1,N-1} c_{N-1,\Pi_2^{(2)}(i)}|^2 \quad (17)$$

The calculated cumulative metric is inputted to the average cumulative metric calculation section 508 in the second stage, a surviving path determination section 511 and a metric calculation section 512 in the third stage.

The average cumulative metric calculation section 508 calculates an average value of the cumulative metric value represented by the following expression (18):

$$d_2^{(average)} = \frac{1}{S_2} \sum_{i=1}^{S_2} d_2(\Pi^{(2)}(i)) \quad (18)$$

in order to use the same for surviving path selection in the third stage. The average value of the cumulative metric value is inputted to a second parameter calculation section 509 in the third stage.

The third stage processing section 501-3 takes charge of the reproduction process in the third stage and can be implemented by replacing the first parameter calculation section 504 in the second stage with the second parameter calculation section 509.

The second parameter calculation section 509 calculates, using the upper triangular matrix R inputted from the QR decomposition processing section 401 and the average cumulative metric value inputted from the average cumulative metric calculation section 508 in the second stage, a ratio $$\beta_3 = \frac{r_{N-2,N-2}}{d_2^{(average)}}$$

between the upper triangular matrix diagonal component elements and the average cumulative metric. The calculated upper triangular matrix diagonal component element average cumulative metric ratio $\beta_3$ is inputted to the surviving path selection section 511.

The surviving path selection section 511 determines a selection method for a surviving path based on the upper triangular matrix diagonal component element average cumulative metric ratio $\beta_3$ inputted thereto from the second parameter calculation section 509, and selects a number of surviving paths $\Pi^{(3)}(i)$ equal to the surviving path number $S_3$ in the second stage based on the determined surviving path selection method and the result of the ranking inputted thereto from the ranking determination section 510.

In the present example, as an example of surviving path selection in the kth stage after the third stage, a table which indicates a relationship between values of the upper triangular matrix diagonal component element average cumulative metric ratio $\beta_k$ and numbers of paths to be selected in advance is searched to select $\chi(i)$ candidate replicas of comparatively high ranks in the ranking in the kth stage as surviving paths regarding the surviving paths having the ith lowest metric value in the k−1th stage.

It is to be noted that the surviving path selection table is produced such that, as the value $\beta_k$ described above decreases, the number of paths which are to be selected from among the surviving paths whose cumulative metric in the preceding stage is small increases but, as the value $\beta_k$ increases, the number of paths which are to be selected also from among the paths whose cumulative metric in the preceding stage is great increases.

The kth (k=4, ..., N) stage processing section after the fourth stage is configured similarly to the third stage processing section 501-3. Accordingly, the process described above is carried out up to the last Nth stage.

It is to be noted that, since there is no next stage to the last stage, the average cumulative metric calculation section 513 need not be provided in the last stage. In particular, an Nth stage processing section 501-N which takes charge of the MIMO demodulation process in the Nth stage includes a second parameter calculation section 514, a ranking determination section 515, a surviving path selection section 516 and a metric calculation section 517. A cumulative metric calculated by the metric calculation section 517 in the Nth stage is inputted to an LLR calculation section 600.

The LLR calculation section 600 calculates a bit LLR for each transmission stream. First, a minimum value of the cumulative metric is searched and a surviving path whose cumulative metric is equal to the minimum value is determined as the most-likely combination of symbols. The bit LLR of the nth bit of the lth stream $x_l$ is the difference between the total metric with regard to the most-likely symbol combination and a minimum value of a cumulative metric with regard to a symbol having an inverse value of the nth bit of the most-likely symbol.

In particular, parameters are calculated first as given by the following expressions:

$$\Pi^{(N),ML} = \mathrm{argmin}\lfloor d_N(\Pi^{(N)}(i)) \rfloor$$

$$d_{l,min}(b_n = \mathrm{bit}(\Pi_l^{(N),ML}, n)) = d(\Pi^{(N),ML})$$

$$d_{l,min}(b_n = invbit(\Pi_l^{(N),ML}, n)) = \min_{bit(\Pi_l^{(N)},n) = invbit(\Pi_l^{(N),ML},n)} \lfloor d(\Pi_l^{(N)}) \rfloor$$

where l is a stream number, and bit(x,n) and invbit(x,n) are an nth bit value of x and an nth inverse bit value of x, respectively. The bit LLR given by the following expression (19) is calculated by using the parameters:

$$LLR_l(n) = d_{l,min}(b_n=1) - d_{l,min}(b_n=0) \quad (19)$$

It is to be noted that, while the bit LLR is determined as a difference of the metric as described above, a square root may be used as represented by the following expression (20):

$$LLR_l(n) = \sqrt{d_{l,min}(b_n=1)} - \sqrt{d_{l,min}(b_n=0)} \quad (20)$$

(1. 2) Operation of the Receiver According to the Embodiment

Here, an example of operation of the receiver 300 according to the embodiment is described with reference to a flow chart illustrated in FIG. 14.

First, a predetermined wireless reception process is carried out for signals received by the reception antenna 301 by the reception section 302, and resulting signals are inputted to the demodulation section 303 (step S101).

Then, pilot signals and so forth transmitted by the transmitter are extracted from the signals obtained at step S101 and a channel matrix H is estimated by the channel estimation section 305 of the demodulation section 303 (step S102). The estimated channel matrix H is inputted to the MIMO stream separation section 306.

The signals inputted to the MIMO stream separation section 306 are inputted first to the reception signal transformation section 400. Then, QR decomposition is carried out for the channel matrix H obtained at step S102 by the QR decomposition processing section 401 of the reception signal transformation section 400 and a unitary matrix Q and an upper triangular matrix R are outputted (step S103).

Then, the reception signal vector y obtained at step S101 is multiplied by an Hermite conjugate of the unitary matrix Q obtained at step S103 by the unitary transformation section 402 to calculate the unitary transformation vector z (step S104).

Then, the upper triangular matrix R obtained at step S103 and the unitary transformation vector z obtained at step S104 are inputted to the MIMO demodulation section 500, and a predetermined data reproduction process is carried out by the first stage processing section 501-1 to the Nth stage processing section 501-N.

First, by the ranking determination section 502 of the first stage processing section 501-1, ranking of candidate replicas of the transmission signal $x_N$ is carried out using the upper triangular matrix R obtained at step S103 and the unitary transformation vector z obtained at step S104 (S105).

Then, a metric is calculated regarding $S_1$ surviving replicas determined in the descending order of the rank of the ranking obtained at step S105 by the metric calculation section 503 (step S106).

Thereafter, the processing advances to the second processing section (step S107).

In the kth stage after the first stage, ranking of the candidate replicas of the transmission signal $x_{N-k+1}$ is first carried out by the ranking determination section 505, 510 or 515 using the upper triangular matrix R obtained at step S103, unitary transformation vector z obtained at step S104 and surviving replicas in the k−1th stage (step S108).

Then, it is decided whether or not the present process is carried out in the second stage (step S109), and, if it is decided that the process is carried out in the second stage (Yes route at step S109), then a ratio α between the second diagonal component elements from the bottom and the diagonal component elements in the lowest stage of the upper triangular matrix R obtained at step S103 is calculated by the first parameter calculation section 504 (step S110). On the other hand, if it is decided that the processing already advances to the process at or after the third stage (No route at step S109), then a ratio β between the diagonal component elements of the upper triangular matrix R obtained at step S103 and the average cumulative metric obtained in the k−1th stage is calculated by the second parameter calculation section 509 or 514 (step S111).

Then, the number of surviving paths is determined based on the ratio α obtained at step S110 or the ratio β obtained at step S111 by the surviving path selection sections 506, 511 or 516, and surviving paths in the kth stage are selected based on the determined number of surviving paths and the ranking obtained at step S108 (step S112).

Then, a metric and a cumulative metric are calculated regarding the surviving paths selected at step S112 by the metric calculation section 507, 512 or 517 (step S113).

Then, it is decided whether or not the present process is carried out in the Nth stage (step S114), and, if it is decided that the process is carried out in the Nth stage (Yes route at step S114), then the processing advances to step S117. On the other hand, if it is decided that the present process is not carried out in the Nth stage (No route at step S114), then an average value of the cumulative metric obtained at step S113 is calculated by the average cumulative metric calculation section 508 or 513 (step S115).

At the next step, the processing advances to the next stage (step S116).

Then, it is decided whether or not the processes till the Nth stage are incomplete (step S117), and, if it is decided that the processes till the Nth stage are incomplete (Yes route at step S117), then the processing advances to step S108 and the processes from step S108 to step S116 are carried out till the Nth stage. On the other hand, if it is decided that the processes till the Nth stage are not incomplete, that is, are completed already (No route at step S117), then a bit LLR is calculated regarding each transmission stream by the LLR calculation section 600 (step S118).

Then, predetermined error correction decoding is carried out for the streams separated by the MIMO stream separation section 306 by the error correction decoding section 304 (step S119).

By carrying out the surviving path selection by means of the surviving path selection section 506, 511 or 516 based on the result of the calculation by the first parameter calculation section 504 or the second parameter calculation section 509 or 514 as described above, the signal processing amount upon data reproduction can be reduced.

[2] First Modification

Figure 15:
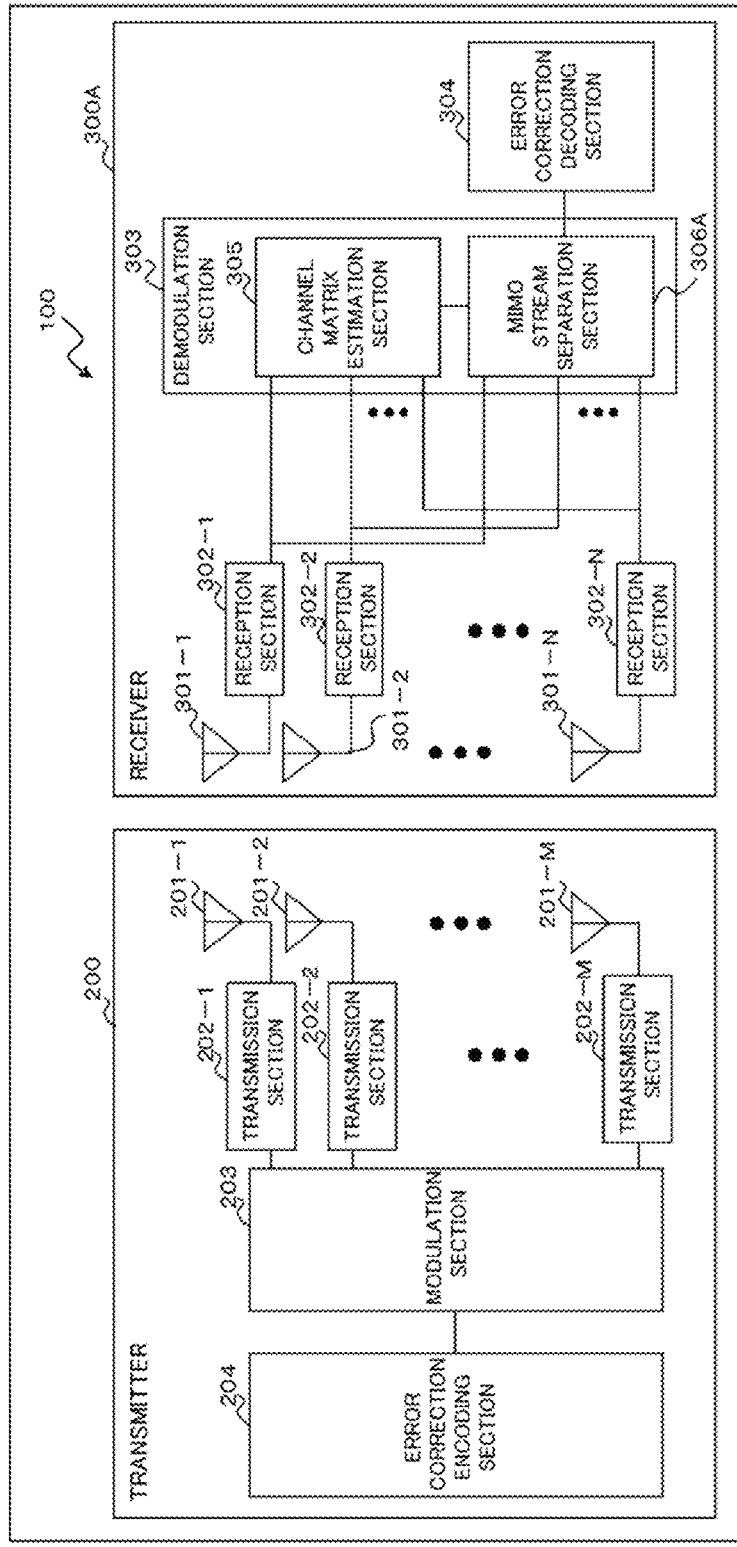
FIG. 15 is a block diagram illustrating an example of a configuration of a MIMO system according to a first modification.

An example of a configuration of a MIMO system according to the first modification is illustrated in FIG. 15. It is to be noted that, in FIG. 15, since like elements to those in the embodiment described above are denoted by like reference characters, detailed description of the like elements is omitted.

As illustrated in FIG. 15, in the first modification, a MIMO stream separation section 306A is provided.

Figure 16:
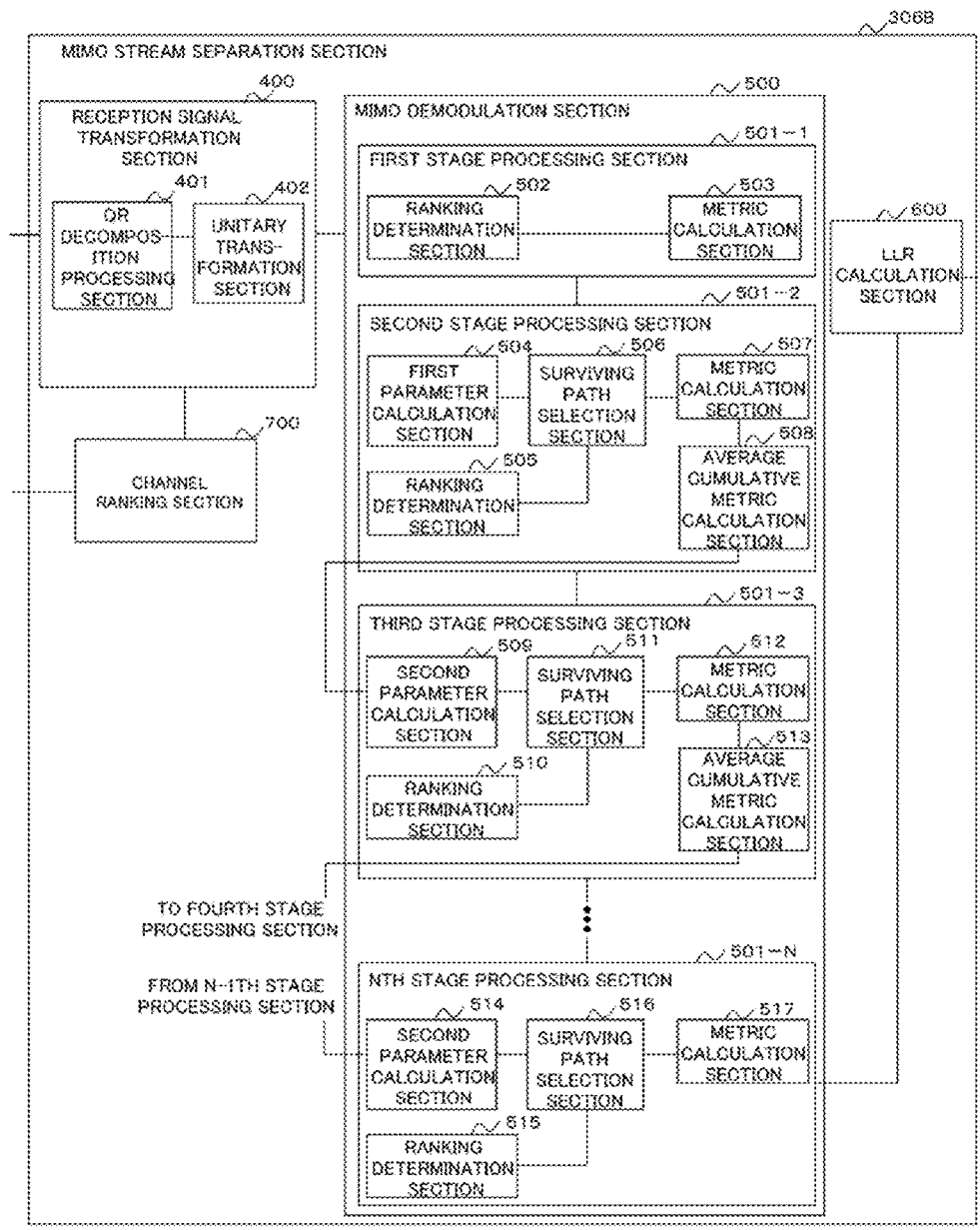
FIG. 16 is a block diagram illustrating an example of a configuration of a MIMO stream separation section illustrated in FIG. 15.

An example of a configuration of the MIMO stream separation section 306A according to the first modification is illustrated in FIG. 16. It is to be noted that, also in FIG. 16, like elements to those in the embodiment described above are denoted by like reference characters, and therefore, detailed description of the like elements is omitted.

As illustrated in FIG. 16, in the first modification, the MIMO stream separation section 306A illustratively includes a channel ranking section 700.

The channel ranking section 700 receives a channel matrix H inputted from the channel estimation section 305 to calculate a sum $$P_f = \sum_{\varsigma=1}^{N} |h_{\varsigma f}|^2$$

of the power of fth column component elements of the channel matrix H, and row vectors of the channel matrix are re-arranged so that they are arranged in the descending order of the value $P_f$ from the right.

As an example, a case in which the channel matrix H of three rows and three columns given by the following expression (21) is inputted to the channel ranking section 700 is described.

$$H = \begin{pmatrix} h_{11} & h_{12} & h_{13} \\ h_{21} & h_{22} & h_{23} \\ h_{31} & h_{32} & h_{33} \end{pmatrix} \quad (21)$$

For example, it is assumed that, as a result of the calculation of the value $P_f$, a relationship of $P_2 < P_3 < P_1$ is obtained. Then, by the channel ranking section 700, re-arrangement of the column vectors is carried out for the channel matrix H given by the expression (21) given hereinabove so that the vectors are arranged in the descending order of the value $P_f$ from the right thereby to obtain a channel matrix H' given by the following expression (22):

$$H' = \begin{pmatrix} h_{12} & h_{13} & h_{11} \\ h_{22} & h_{23} & h_{21} \\ h_{32} & h_{33} & h_{31} \end{pmatrix} \quad (22)$$

The channel matrix H' for which the re-arrangement has been carried out is inputted to the reception signal transformation section 400.

In particular, the channel ranking section 700 functions as an example of a channel matrix transformation section for generating, based on power values of column component elements which configure a channel matrix between the transmitter 200 and the receiver 300, a transformed channel matrix in which column component elements are re-arranged.

It is to be noted that, in the present modification, as an example, a case is described in which the channel ranking section 700 carries out re-arrangement of column component elements in the descending order of the sum total of the power values of the column component elements which configure the channel matrix between the transmitter 200 and the receiver 300. However, the present invention is limited to this. For example, the channel ranking section 700 may carry out re-arrangement of the column component elements which configure the channel matrix based on a signal to noise ratio for each reception signal.

Figure 17:
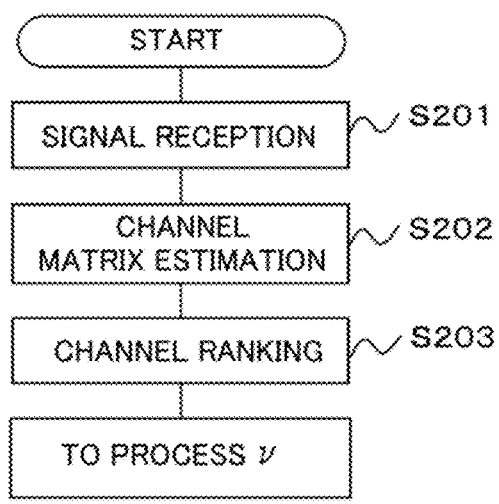
FIG. 17 is a flow chart illustrating an example of operation of a receiver according to the first modification.

An example of a flowchart according to the first modification is shown in FIG. 17.

First, a predetermined wireless reception process is carried out by the reception section 302 for signals received by the reception antennas 301 and then results of the process are inputted to the demodulation section 303 (step S201).

Then, pilot signals transmitted from the transmitter or the like are extracted from the signals obtained at step S201 and a channel matrix H is estimated by the channel estimation section 305 of the demodulation section 303 (step S202). The estimated channel matrix H is inputted to the MIMO stream separation section 306A.

Then, re-arrangement of column vectors is carried out for the channel matrix H obtained at step S202 by the channel ranking section 700 of the MIMO stream separation section 306A (step S203). A channel matrix H' obtained by carrying out the re-arrangement described above is inputted to the reception signal transformation section 400.

Figure 14:
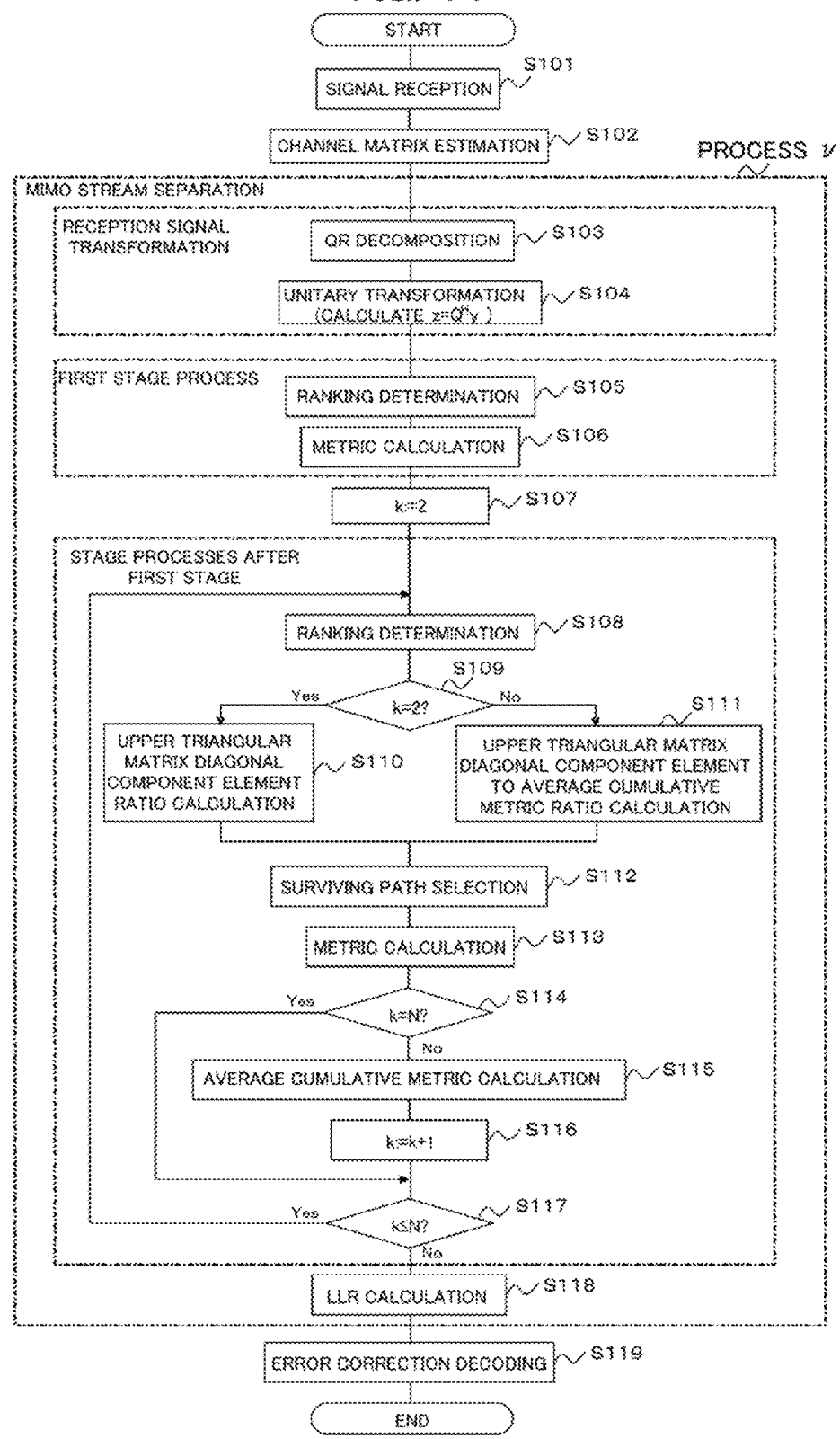
FIG. 14 is a flow chart illustrating an example of operation of a receiver according to the embodiment.

Then, QR decomposition is carried out for the channel matrix H' obtained at step S203 by the QR decomposition processing section 401 of the reception signal transformation section 400, and thereafter, the process v illustrated in FIG. 14 is carried out similarly as in the embodiment described above.

With the first modification described above, since the diagonal component elements $r_{N,N}$ of the Nth row of the upper triangular matrix R obtained after the QR decomposition process by the QR decomposition processing section 401 can take a high value, the influence of noise can be reduced in the calculation of the value $u_{N,n}$ in the first stage processing section 501-1 and symbol replica candidates can be selected more accurately.

Further, since, in the succeeding stages, symbol replica candidates are selected based on the result of the selection in the first stage, also symbol replica candidates in the succeeding stages can be selected accurately. As a result, the data reproduction accuracy of the receiver 300 can be enhanced.

[3] Second Modification

Further, while, in the embodiment described above, the ratio α of the diagonal component elements of the upper triangular matrix R is used for surviving path selection in the second stage, the ratio between the average cumulative metric value and the diagonal component elements of the upper triangular matrix R till the preceding stage may be used similarly as in the processes at and after the third stage. Therefore, in the second embodiment, an upper triangular matrix diagonal component element average cumulative metric ratio $\beta_2$ is used for surviving path selection in the second stage.

Figure 18:
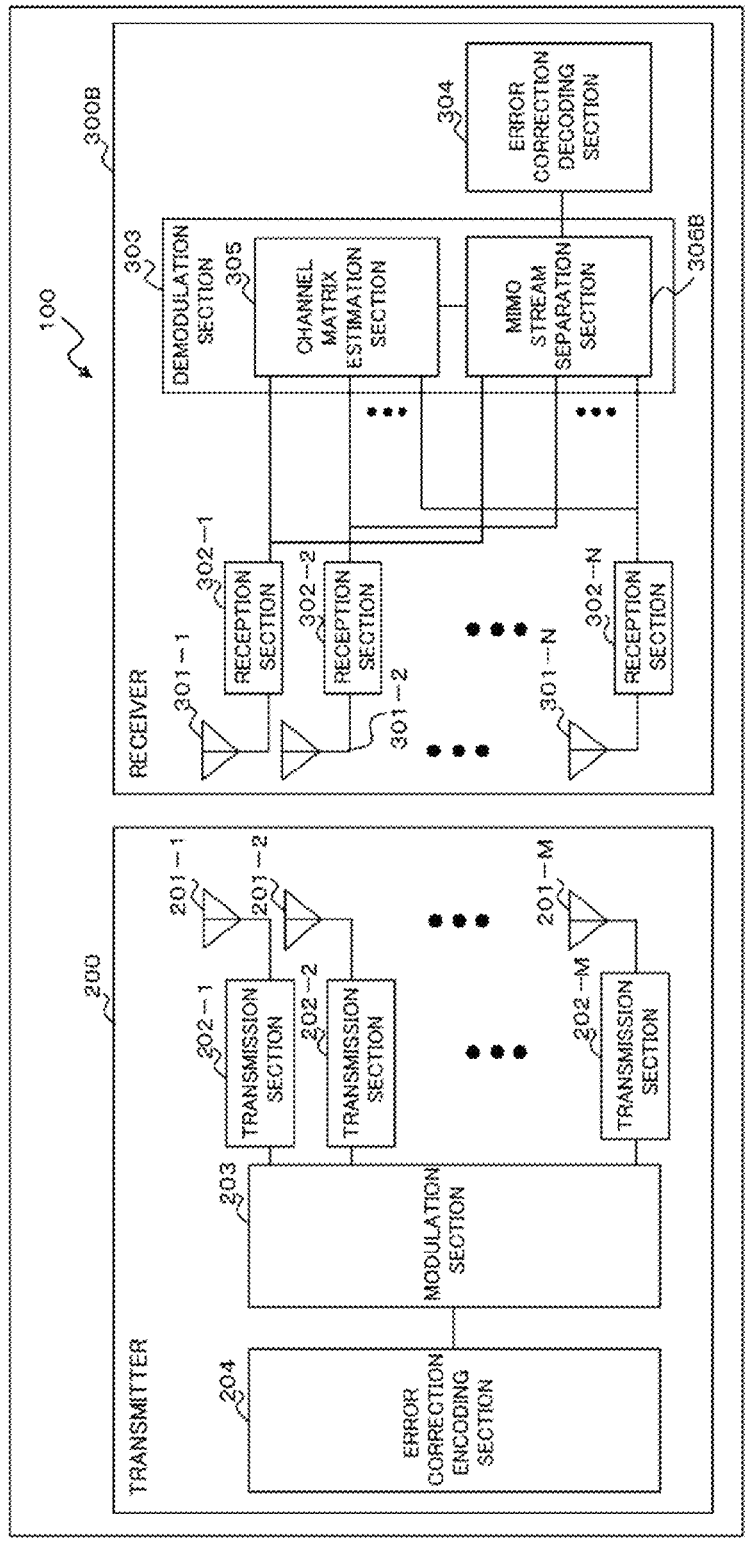
FIG. 18 is a block diagram illustrating an example of a configuration of a MIMO system according to a second modification.

An example of a configuration of a MIMO system according to the second modification is illustrated in FIG. 18. It is to be noted that, in FIG. 18, like elements to those in the embodiment described above are denoted by like reference characters, and therefore, detailed description of the like elements is omitted.

As illustrated in FIG. 18, in the second modification, a MIMO stream separation section 306B is provided.

Figure 19:
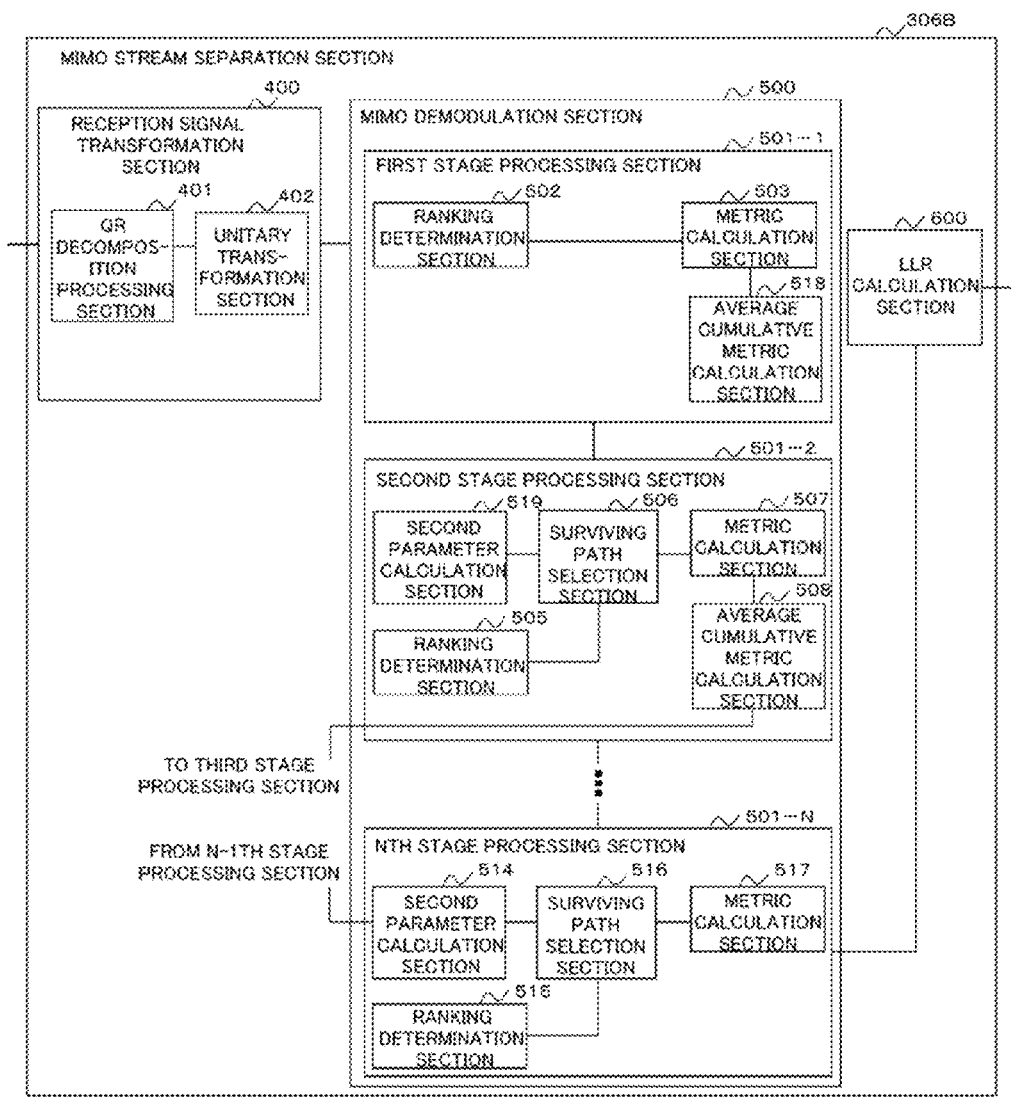
FIG. 19 is a block diagram illustrating an example of a configuration of a MIMO stream separation section illustrated in FIG. 18.

An example of a configuration of the MIMO stream separation section 306B according to the second modification is illustrated in FIG. 19. It is to be noted that, also in FIG. 19, like elements to those in the embodiment described above are denoted by like reference characters, and therefore, detailed description of the like elements is omitted.

The average cumulative metric calculation section 518 of the first stage processing section 501-1 calculates an average cumulative metric given by the following expression (23) using a metric determined by the expression (13) given hereinabove and inputted from the metric calculation section 503:

$$d_1^{(average)} = \frac{1}{S_1} \sum_{i=1}^{S_1} d_1(\Pi^{(1)}(i)) \quad (23)$$

The calculated average cumulative metric is inputted to the second parameter calculation section 519 of the second stage processing section 501-2.

The second parameter calculation section 519 calculates, using an average cumulative metric inputted from the average cumulative metric calculation section 518, a ratio $\beta_2$ given by the following expression (24) between the upper triangular matrix diagonal component elements and the average cumulative metric:

$$\beta_2 = \frac{r_{N-1,N-1}}{d_1^{(average)}} \quad (24)$$

The other processes are similar to those of the embodiment described hereinabove.

An example of a flow chart of the present modification is illustrated in FIG. 20.

First, a predetermined wireless reception process is carried out by the reception section 302 for signals received by the reception antennas 301 and then resulting signals are inputted to the demodulation section 303 (step S301).

Then, pilot signals transmitted from the transmitter and so forth are extracted from the signals obtained at step S301 and a channel matrix H is estimated by the channel estimation section 305 of the demodulation section 303 (step S302). The estimated channel matrix H is inputted to the MIMO stream separation section 308.

The signal inputted to the MIMO stream separation section 308 is inputted first to the reception signal transformation section 400. Then, QR decomposition is carried out for the channel matrix H obtained at step S302 by the QR decomposition processing section 401 of the reception signal transformation section 400, and a unitary matrix Q and the upper triangular matrix R are outputted from the QR decomposition processing section 401 (step S303).

Then, the reception signal vector y obtained at step S301 is multiplied by an Hermite conjugate of the unitary matrix Q obtained at step S303 by the unitary transformation section 402 to calculate a unitary transformation vector z (step s304).

Then, the upper triangular matrix R obtained at step S303 and the unitary transformation vector obtained at step S304 are inputted to the MIMO demodulation section 500 and predetermined data reproduction processes are carried out by the first to Nth stage processing sections 501-1 to 501-N.

First, ranking of candidate replicas of the transmission signal $x_N$ is carried out by the ranking determination section 502 of the first stage processing section 501-1 using the upper triangular matrix R obtained at step S303 and the unitary transformation vector z obtained at step S304 (step S305).

Then, a metric is calculated regarding $S_1$ surviving replicas determined in the descending order of the rank in the ranking obtained at step S305 by the metric calculation section 503 (step S306).

Then, an average value of the cumulative metric is calculated by the average cumulative metric calculation section 518 in the first stage using the metrics obtained at step S306 (step S307).

Thereafter, the processing advances to the second stage processing section (step S308).

In the kth stage after the second stage, ranking of the candidate replicas of the transmission signal $x_{N-k+1}$ is carried out first by the ranking determination section 505 or 515 using the upper triangular matrix R obtained at step S303, unitary transformation vector z obtained at step S304 and surviving replicas in the k−1th stage (step S309).

Then, a ratio β between the diagonal component elements of the upper triangular matrix R obtained at step S303 and the average cumulative metric obtained in the k−1th stage is calculated by the second parameter calculation section 514 or 519 (step S310).

Then, the number of surviving paths is determined based on the ranking obtained at step S309 and the ratio β obtained at step S310 and surviving paths in the kth stage are selected based on the determined surviving path number and the ranking obtained at step S308 by the surviving path selection section 506 or 516 (step S311).

Then, a metric and a cumulative metric are calculated regarding the surviving paths selected at step S311 by the metric calculation section 507 or 517 (step S312).

Then, it is decided whether or not the present process is carried out in the Nth stage (step S313), and, if it is decided that the present process is carried out in the Nth stage (Yes route at step S313), then the processing advances to step S316. On the other hand, if it is decided that the present process is not carried out in the Nth stage (No route at step S313), then an average value of the cumulative metric obtained at step S312 is calculated by the average cumulative metric calculation section 508 (step S314).

At a next step, the processing advances to the next stage (step S315).

Then, it is decided whether or not the processes till the Nth stage are incomplete (step S316), and, if it is decided that the processes till the Nth stage are incomplete (Yes route at step S316), then the processing advances to step S309 and the processes from step S309 to step S315 are carried out till the Nth stage. On the other hand, if it is decided that the processes till the Nth stage are not incomplete, that is, are completed already (No route at step S316), then a bit LLR is calculated regarding each transmission stream by the LLR calculation section 600 (step S317).

Then, predetermined error correction decoding by the error correction decoding section 304 is carried out for the streams separated by the MIMO stream separation section 306B (step S318).

With the second modification described above, since the stages rather than the second stage processing section 501-2 have configurations similar to each other, the processing substances in the MIMO demodulation section 500 can be simplified and the fabrication cost for the receiver 300B can be reduced significantly.

[4] Others

It is to be noted that the configurations and functions of the transmitter 200, receiver 300, receiver 300A and receiver 300B described above may be adopted or abandoned as occasion demands, or may be combined and used suitably. In other words, the configurations and the functions described above may be adopted or abandoned or may be combined and used suitably in order that the function of the present invention can be exhibited.

Further, while an example is described in which ranking of signal points is carried out by referring to the ranking table stored in a table or the like after region decision of the values $u_{N,n}$ is carried out in the ranking of signal points by the ranking determination section 502, 505, 510 or 515 in the embodiment described above, the ranking of signal points may be carried out in the ascending order of the distance to the values $u_{N,n}$. In particular, ranking of signal points may be carried out in the ascending order of the distance using distances between the value $u_{N,n}$ and the signal points calculated by the ranking determination section 502, 505, 510 or 515.

Further, while the embodiment is described illustratively taking a case in which QPSK or 64QAM is used as the modulation method for the ranking of signal points in the embodiment described above, the embodiment is not limited to the modulation methods but can be carried out also in a case in which a different modulation method is used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A signal processing method for a wireless communication system including a transmitter which transmits a wireless signal using M transmission antennas and a receiver which receives the wireless signal using N reception antennas, M and N individually being integers equal to or greater than two, the signal processing method comprising:
performing QR decomposition of a channel matrix between the transmitter and the receiver into products of an orthogonal matrix Q and an upper triangular matrix R;
calculating products $Q^H y$ of $Q^H$ which is Hermite conjugate of the orthogonal matrix Q and a reception column vector y including N reception signals received by the receiver as component elements;
calculating a signal corresponding to a component element of an Mth row of a transmission column vector x, which includes M transmission signals as component elements, based on the calculated products $Q^H y$ and the upper triangular matrix R;
selecting a plurality of transmission signal candidates regarding the component element of the Mth row of the transmission column vector x which are ranked in response to an inter-signal point distance with the signal calculated on a constellation by carrying out a region decision on the constellation regarding the calculated signal;
selecting a number of transmission signal candidates corresponding to predetermined parameters based on inter-signal point distances between the plurality of transmission signal candidates and signals corresponding to component elements of the (M−1)th to 1st rows of the transmission column vector x from the plurality of transmission signal candidates regarding the component elements of the (M−1)th to 1st rows of the transmission column vector x by carrying out a region decision on the constellation regarding the signals based on the calculated products $Q^H y$, the upper triangular matrix R and the selected plurality of transmission signal candidates; and
reproducing the M transmission signals by determining a unique set of the transmission signal candidates regarding the component elements of the Mth to 1st rows of the transmission column vector x based on the sum total of the inter-signal point distances between the selected transmission signal candidates and the signals corresponding to the component elements of the (M−1)th to 1st rows of the transmission column vector x, wherein
the predetermined parameters include:
a ratio between an average value of the sum totals of the inter-signal point distances and a diagonal component element of the upper triangular matrix R; or
a ratio between a diagonal component element of the (M−1)th row of the upper triangular matrix R and a diagonal component element of the Mth row of the upper triangular matrix R.

2. A signal processing method for a wireless communication system including a transmitter which transmits a wireless signal using M transmission antennas and a receiver which receives the wireless signal using N reception antennas, M and N individually being integers equal to or greater than two, the signal processing method comprising:
generating, based on electric power values of column component elements which configure a channel matrix between the transmitter and the receiver, a transformation channel matrix in which the column component elements are re-arranged;
performing QR decomposition of the generated transformation channel matrix into products between an orthogonal matrix Q and an upper triangular matrix R;
calculating a signal corresponding to a component element of an Mth row of a transmission column vector x, which includes M transmission signals as component elements, based on the calculated products $Q^H y$ and the upper triangular matrix R;
selecting a plurality of transmission signal candidates regarding the component element of the Mth row of the transmission column vector x which are ranked in response to an inter-signal point distance with the signal calculated on a constellation by carrying out a region decision on the constellation regarding the calculated signal;
selecting a number of transmission signal candidates corresponding to predetermined parameters based on inter-signal point distances between the plurality of transmission signal candidates and signals corresponding to component elements of the (M−1)th to 1st rows of the transmission column vector x from the plurality of transmission signal candidates regarding the component elements of the (M−1)th to 1st rows of the transmission column vector x by carrying out a region decision on the constellation regarding the signals based on the calculated products $Q^H y$, the upper triangular matrix R and the selected plurality of transmission signal candidates; and
reproducing the M transmission signals by determining a unique set of the transmission signal candidates regarding the component elements of the Mth to 1st rows of the transmission column vector x based on the sum total of the inter-signal point distances between the selected transmission signal candidates and the signals corresponding to the component elements of the (M−1)th to 1st rows of the transmission column vector x, wherein
the predetermined parameters include:
a ratio between an average value of the sum totals of the inter-signal point distances and a diagonal component element of the upper triangular matrix R; or
a ratio between a diagonal component element of the (M−1)th row of the upper triangular matrix R and a diagonal component element of the Mth row of the upper triangular matrix R.

3. A receiver for a wireless communication system which includes a transmitter which transmits a wireless signal using M transmission antennas and said receiver which receives the wireless signal using N reception antennas, M and N individually being integers equal to or greater than two, the receiver comprising:
a QR decomposition processor that performs QR decomposition of a channel matrix between the transmitter and said receiver into products between an orthogonal matrix Q and an upper triangular matrix R;
a unitary transformer that calculates products $Q^H y$ between $Q^H$ which is Hermite conjugate of the orthogonal matrix Q calculated by said QR decomposition processor and a reception column vector y including N reception signals received by said receiver as component elements; and
a signal reproducer that calculates a signal corresponding to a component element of an Mth row of a transmission column vector x, which includes M transmission signals as component elements, based on the products $Q^H y$ calculated by said unitary transformer and the upper triangular matrix R, selects a plurality of transmission signal candidates regarding component elements of the Mth row of the transmission column vector x, which are ranked in response to an inter-signal point distance with the signal calculated on a constellation by carrying out a region decision on the constellation regarding the calculated signal, selects a number of transmission signal candidates corresponding to predetermined parameters based on inter-signal point distances between the plurality of transmission signal candidates and signals corresponding to component elements of the (M−1)th to 1st rows of the transmission column vector x from the plurality of transmission signal candidates regarding the component elements of the (M−1)th to 1st rows of the transmission column vector x by carrying out a region decision on the constellation regarding the signals based on the calculated products $Q^H y$, the upper triangular matrix R and the selected plurality of transmission signal candidates, and reproduces the M transmission signals by determine a unique set of the transmission signal candidates regarding the component elements of the Mth to 1st rows of the transmission column vector x based on the sum total of the inter-signal point distances between the selected transmission signal candidates and the signals corresponding to the component elements of the (M−1)th to 1st rows of the transmission column vector x, wherein the predetermined parameters include:
  a ratio between an average value of the sum total of the inter-signal point distances and a diagonal component element of the upper triangular matrix R; or
  include a ratio between a diagonal component element of the (M−1)th row of the upper triangular matrix R and a diagonal component element of the Mth row of the upper triangular matrix R.

4. A signal processing method for a wireless communication system including a transmitter which transmits a wireless signal using M transmission antennas and a receiver which receives the wireless signal using N reception antennas, M and N individually being integers equal to or greater than two, the signal processing method comprising:
  performing QR decomposition of a matrix related to a channel matrix between the transmitter and the receiver into products of an orthogonal matrix Q and an upper triangular matrix R;
  calculating a signal corresponding to a component element of an Mth row of a transmission column vector x, which includes M transmission signals as component elements, based on the orthogonal matrix Q and the upper triangular matrix R, and a reception column vector y including N reception signals received by the receiver as component elements;
  selecting a plurality of transmission signal candidates regarding the component element of the Mth row of the transmission column vector x which are ranked in response to an inter-signal point distance on a constellation regarding the calculated signal;
  selecting a number of transmission signal candidates corresponding to a ratio between an average value of the sum totals of inter-signal point distances and a diagonal component element of the upper triangular matrix R, or a ratio between a diagonal component element of the (M−1)th row of the upper triangular matrix R and a diagonal component element of the Mth row of the upper triangular matrix R, the inter-signal point distances being between the plurality of transmission signal candidates and signals on the constellation, the signals corresponding to component elements of the (M−1)th to 1st rows of the transmission column vector x, based on the inter-signal point distances from the plurality of transmission signal candidates regarding the component elements of the (M−1)th to 1st rows of the transmission column vector x regarding the signals; and
  reproducing the M transmission signals by determining a unique set of the transmission signal candidates regarding the component elements of the Mth to 1st rows of the transmission column vector x based on the sum total of the inter-signal point distances between the selected transmission signal candidates and the signals corresponding to the component elements of the (M−1)th to 1st rows of the transmission column vector x.

5. A receiver for a wireless communication system which includes a transmitter which transmits a wireless signal using M transmission antennas and said receiver which receives the wireless signal using N reception antennas, M and N individually being integers equal to or greater than two, the receiver comprising:
  a QR decomposition processor that performs QR decomposition of a matrix related to a channel matrix between the transmitter and said receiver into products between an orthogonal matrix Q and an upper triangular matrix R; and
  a signal reproducer that calculates a signal corresponding to a component element of an Mth row of a transmission column vector x, which includes M transmission signals as component elements, based on the orthogonal matrix Q and the upper triangular matrix R, and a reception column vector y including N reception signals received by the receiver as component elements, selects a plurality of transmission signal candidates regarding component elements of the Mth row of the transmission column vector x, which are ranked in response to an inter-signal point distance on a constellation regarding the calculated signal, selects a number of transmission signal candidates corresponding to a ratio between an average value of the sum total of inter-signal point distances and a diagonal component element of the upper triangular matrix R; or a ratio between a diagonal component element of the (M−1)th row of the upper triangular matrix R and a diagonal component element of the Mth row of the upper triangular matrix R, the inter-signal point distances being between the plurality of transmission signal candidates and signals on the constellation, the signals corresponding to component elements of the (M−1)th to 1st rows of the transmission column vector x, based on the inter-signal point distances from the plurality of transmission signal candidates regarding the component elements of the (M−1)th to 1st rows of the transmission column vector x regarding the signals, and reproduces the M transmission signals by determine a unique set of the transmission signal candidates regarding the component elements of the Mth to 1st rows of the transmission column vector x based on the sum total of the inter-signal point distances between the selected transmission signal candidates and the signals corresponding to the component elements of the (M−1)th to 1st rows of the transmission column vector x.

* * * * *